US007027975B1

(12) United States Patent
Pazandak et al.

(10) Patent No.: US 7,027,975 B1
(45) Date of Patent: Apr. 11, 2006

(54) GUIDED NATURAL LANGUAGE INTERFACE SYSTEM AND METHOD

(75) Inventors: Paul N. Pazandak, Bloomington, MN (US); Craig Thompson, Plano, TX (US)

(73) Assignee: Object Services and Consulting, Inc., West Grove, PA (US)

( * ) Notice: Subject to any disclaimer, the term of this patent is extended or adjusted under 35 U.S.C. 154(b) by 857 days.

(21) Appl. No.: 09/634,108

(22) Filed: Aug. 8, 2000

(51) Int. Cl.
*G10F 17/27* (2006.01)

(52) U.S. Cl. .......................................... 704/9
(58) Field of Classification Search .................... 704/9, 704/257, 270.1; 707/3
See application file for complete search history.

(56) References Cited

U.S. PATENT DOCUMENTS

| | | | |
|---|---|---|---|
| 4,688,195 A * | 8/1987 | Thompson et al. ........... 706/11 |
| 4,829,423 A | 5/1989 | Tennant et al. ............. 364/200 |
| 5,083,268 A | 1/1992 | Hemphill et al. ............. 395/12 |
| 5,745,550 A * | 4/1998 | Eisdorfer et al. ............. 379/52 |
| 6,012,067 A | 1/2000 | Sarkar |
| 6,021,418 A | 2/2000 | Brandt et al. |
| 6,055,538 A | 4/2000 | Kessenich et al. |
| 6,064,951 A | 5/2000 | Park et al. |
| 6,085,198 A | 7/2000 | Skinner et al. |
| 6,321,235 B1 * | 11/2001 | Bird ............................ 707/203 |
| 6,615,172 B1 * | 9/2003 | Bennett et al. ............. 704/257 |

FOREIGN PATENT DOCUMENTS

EP 0924628 A2 * 6/1999 .................. 707/101

* cited by examiner

*Primary Examiner*—Richmond Dorvil
*Assistant Examiner*—Donald L. Storm
(74) *Attorney, Agent, or Firm*—The Law Firm of H. Dale Langley, Jr., PC

(57) ABSTRACT

A method for a guided natural language interface includes inputting to a thin client a query, communicating to an interface intermediary, communicating to an interface descriptor data source, generating an interface descriptor, communicating the interface descriptor to the interface intermediary, communicating the interface descriptor to a parser farm, requesting an appropriate parser corresponding to the interface descriptor, assigning an appropriate parser, parsing, communicating a translation from the step of parsing, to the interface intermediary, and communicating the translation to the thin client. The thin client can be geographically remote from any or all of the steps other than the step of inputting, such that the method is performed over a disparate enterprise, such as a network, for example, the Internet.

33 Claims, 18 Drawing Sheets

| NLI Query Execution #1 | | | |
|---|---|---|---|
| File  Commands  Help | | | |
| Fonts | | | |
| SELECT DISTINCT * FROM ENVIRO_CONFERENCE_ATTENDEE WHERE ENVIRO_CONFERENCE_ATTENDEE.HOTEL = "Continental" | | | |
| NAME | HOTEL | PHONE | ADDRESS |
| Chapman, Adam | Continental | 2527300.0 | Bneid al Qar, P.O. Box 1083 Safat |
| Danielson, Pamela | Continental | 2527300.0 | Bneid al Qar, P.O. Box 1083 Safat |
| Darwell, Matthew | Continental | 2527300.0 | Bneid al Qar, P.O. Box 1083 Safat |
| Downs, Barbara | Continental | 2527300.0 | Bneid al Qar, P.O. Box 1083 Safat |
| Halsey, Bonnie | Continental | 2527300.0 | Bneid al Qar, P.O. Box 1083 Safat |
| Hartman, William | Continental | 2527300.0 | Bneid al Qar, P.O. Box 1083 Safat |
| Jones, Hamilton | Continental | 2527300.0 | Bneid al Qar, P.O. Box 1083 Safat |
| Marx, David | Continental | 2527300.0 | Bneid al Qar, P.O. Box 1083 Safat |
| Mead, Alexis | Continental | 2527300.0 | Bneid al Qar, P.O. Box 1083 Safat |
| Peterson, James | Continental | 2527300.0 | Bneid al Qar, P.O. Box 1083 Safat |
| Simon, Denise | Continental | 2527300.0 | Bneid al Qar, P.O. Box 1083 Safat |
| Smith, John | Continental | 2527300.0 | Bneid al Qar, P.O. Box 1083 Safat |
| list the enviro.conference attendees whose hotel name is continental | | | |

*FIG. 18*

GUIDED NATURAL LANGUAGE INTERFACE SYSTEM AND METHOD

BACKGROUND OF THE INVENTION

The present invention generally relates to computers and computing and, more particularly, to natural language interfaces (NLI) for user interfacing with computing devices to interact with computer applications, for example, database programs, on such devices or interconnected devices, by inputting stated questions or commands in natural language, such as English language and grammar, to which the devices and applications respond.

Computational linguistics and natural language processing are rather specialized computing disciplines that relate to the computer user and his ability and mode of communication with computing devices. In the sub-area of natural language processing, more specific areas of research and development include information retrieval from text (for example, using keywords as in conventional search engines, such as Google™); question answering from databases, knowledgebases, or text (for example, linguistically motivated techniques using grammars and lexicons but also pattern-based techniques); natural language generation; natural language translation; text-to-speech; speaker recognition; ontologies (such as, for example, Wordnet™), and conversational analysis. A natural language interface (NLI), as the name implies, is a particular mode or method of user interaction with a computing device or devices in which the user employs natural language, such as the English language and grammar, to communicate inputs, for example, queries and commands, to the devices and applications of the devices. NLIs can often be desired modes for communicating with computing devices, software applications, and related hardware and software components, depending on the particular application or discipline for the devices and in the case of experienced as well as less-sophisticated users.

Certain types of natural language interfaces are conventional. In the conventional NLIs, the user types or speaks unconstrained commands (including queries) with the expectation that the system will understand the speech acts and take the desired action (e.g., return an answer). As can be understood, there are limitations to the capabilities of the conventional NLIs. For example, computing power and features have not previously been adequate to encompass all possible variations and uses of language and grammar. Moreover, the tremendously large numbers and variables of words, contexts, and meanings with any natural language are nearly impossible to accurately process under all applicable language rules and variations.

Because of the limitations of computing and NLIs in the past, computing users who interface using NLIs have typically not fully understood the limited scope and capabilities, or "coverage", of the particular NLIs (such as, in terms of the subset of natural language a system understands, typically delimited by lexical, semantic, grammatical, and domain coverage boundaries). Consequently, NLI commands and language are often not fully or properly interpreted or understood by the NLI or computing system having such interface, and the user likely will not have sufficient command of the natural language subset and limitations of the NLI and extensive training or learning can be required in order to make appropriate and desired use of capabilities of the NLI and related system. The NLIs have not necessarily made interfacing more inherently understandable or easier to the user. In other words, the typical user of natural language commands and NLIs for interfacing with computing devices can risk overshooting or undershooting the underlying application system's capabilities, because of the limitations of those capabilities with the present states of computing capacity and technologies and because of the limits of the user's knowledge and understanding.

In addition to the implications to computing users who interface via NLIs, computer and software developers of NLIs for applications have the overwhelming and virtually impossible task of defining a large number of all possible words, grammar rules, and domain translations necessary in efforts to increase NLI coverage. Because of the magnitude of the efforts in such development, NLI creation is an expensive process, even to retarget from one database to another. All conventional NLIs have limited and mismatch of coverage problems. In the past, this has often caused users who experience the coverage problems to grow frustrated, and fail to make full use or entirely discontinue use of conventional NLIs.

Previously, NLIs have generally been delivered with a set of limited form or "canned" example queries. Users of the NLIs have been encouraged to use these examples or only slight variations thereof to obtain satisfactory results. Nonetheless, these example queries, even if only slightly varied, often tend to interfacing failures or unexpected or incorrect results. Several conventional NLI products include: Microsoft Easy Query™, ELF™, and iPhrase™. No doubt, there are other conventional NLIs and other NLI products. All such known NLI technologies have been limited, however, in acceptability to few useful applications and to very narrow and simple applications in any event, and none have become pervasively used or available in the industry. This is the result of the problems of the conventional NLIs.

Of particular note in the early 1980's, Texas Instruments developed the so-called "NLMenu" system, a natural language interface technology that sought to address certain of the foregoing problems of NLIs. NLMenu employed substantially the same grammar, lexicon, and parsing found in all other NLI systems at the time and even those conventional to date. One nuance at the time of the NLMenu system was that the typical parser was modified in the system to parse a partial sentence and, then, predictively find all next legal completions (i.e., the acceptable next words or phrases under the NLMenu interface lexicon and grammar) and display these legal completions in a constellation menu (i.e., a menu displayed to the user that lists all next lexical choices organized by grammatical category). The user was then able to select from the constellation menu a next word or phrase in the menu, which word or phrase was an appropriate legal completion of the particular natural language input sentence, query, command or other sequence. The NLMenu system is described in U.S. Pat. No. 4,829,423, and certain additional aspects are described in U.S. Pat. Nos. 4,688,195 and 5,083,268.

As with the other conventional NLIs, the NLMenu system presented many of the problems previously described. Moreover, the NLMenu system is quite limited in that it is a single-user system in which constellation menus are displayed on the user's computing device and interact with a single, complex full-featured parser. The constellation menus show a single screen-shot of the user's display of the entire lexicon useable by the user to interface in the natural language, but this is a disadvantage because the menus occupy considerable screen area of the user's display and often obscure other entities or features displayed on the screen that can be the subject of the user's efforts in lodging a natural language query. Switching among and moving features around on the screen of the display can be inconvenient for the user. Furthermore, the parser of the NLMenu system is full-featured and so useful for various situations, but in many instances the parser is excessive in features and cumbersome (i.e., overkill) where alternative and simpler kinds of parsers are more useful and practical. In general, the NLMenu system has been useable for certain applications, but not others. Particularly, the system is not particularly effective for use in present computing environments, in which scalability, multi-user capability, wide area and remote geographic networking, and reduced or "thin client" hardware and software is desired.

The present invention overcomes these and other problems of the prior technology.

SUMMARY OF THE INVENTION

Embodiments of the present invention include systems and methods for light-weight guided NLI client interfaces and supporting parser farms on servers, available concurrently and in real time to a plurality of users, over disperse and geographically disparate networks, such as the Internet.

An embodiment is a system for a natural language interface. The system includes a client device, a server device, and a communications network interconnecting the client device and the server device.

Another embodiment is a system for a natural language interface. The system includes a thin client, a parser farm, a parser, a first communications network for communicatively connecting the thin client and the parser farm, and a second communications network for communicatively connecting another element selected from the group consisting of the parser farm and the parser.

Yet another embodiment is a system for a natural language interface. The system includes a thin client, an interface intermediary, a first communications network connecting the thin client and the interface intermediary, an interface descriptor data source, a second communications network connecting the interface descriptor data source and the interface intermediary, a command intermediary, a third communications network connecting the command intermediary and the interface intermediary, a parser farm, a fourth communications network connecting the parser farm and the interface intermediary, a parser, a fifth communications network communicatively connecting the parser to the parser farm, and a sixth communications network for communicatively connecting the parser and the interface intermediary.

Another embodiment of the system is a method of a natural language interface. The method includes inputting to a thin client a query, requesting an appropriate parser for the query, assigning an appropriate parser, parsing the query, and returning a parsed translation.

Yet another embodiment is a method of parsing. The method includes inputting a query at a first location and parsing the query at a second location.

Another embodiment is a method of a natural language interface. The method includes inputting to a thin client a query, communicating to an interface intermediary, communicating to an interface descriptor data source, generating an interface descriptor, communicating the interface descriptor to the interface intermediary, communicating the interface descriptor to a parser farm, requesting an appropriate parser corresponding to the interface descriptor, assigning an appropriate parser, parsing, communicating a translation from the step of parsing, to the interface intermediary, and communicating the translation to the thin client.

BRIEF DESCRIPTION OF THE DRAWINGS

The present invention may be better understood, and its numerous objects, features, and advantages made apparent to those skilled in the art by referencing the accompanying drawings.

FIG. 18 illustrates embodiments of execution results of a sample query in a tabular format for a natural language interface system, such as the LingoLogic system.

The use of the same reference symbols in different drawings indicates similar or identical items.

DETAILED DESCRIPTION

In computing, communications and processing devices, embodiments provide guided interfaces to such devices and their applications, which guided interfaces are operable as distributed parts of a guided language processor to client devices and server devices, such as in a computer or communications network. Particularly, completion-based interfaces, such as grammar-driven menu-based restricted language interfaces (or so-called "natural language interfaces" (NLI)), and also other interfaces such as guided navigation of categories, path expressions, and languages other than natural languages, as well as speech interfaces to such guided interfaces, are operable distributed among client and server elements. This distribution enables predictive parsing, as well as translation and execution, concurrently and in real time, supporting pluralities of users to simultaneously specify pluralities of queries or commands interfaced to pluralities of devices and applications, including over a network or other distributed computing environment. The embodiments are operable, for example, on the Internet and World Wide Web network. Additionally, embodiments are operable in local area networks and even on a single computer or device.

Figure 1:
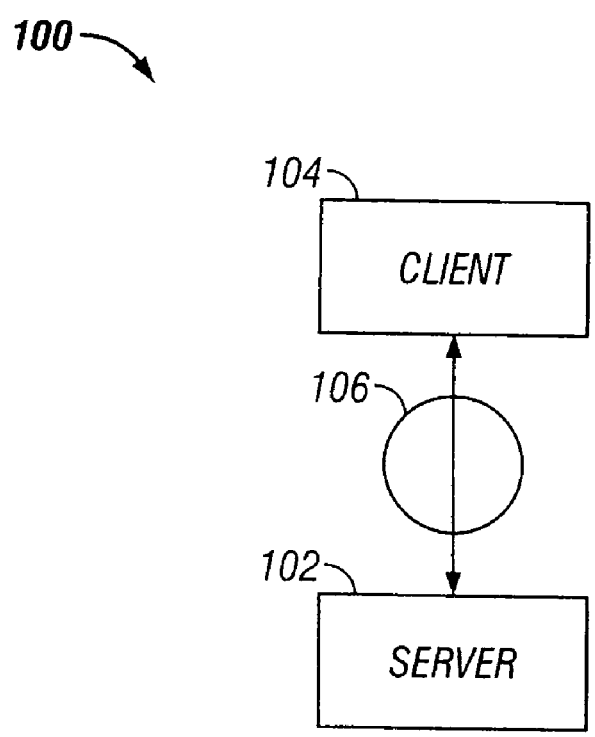
FIG. 1 illustrates embodiments of a client-server system, including a client device and a server device, communicatively connected by a network, such as the Internet, for serving as a natural language interface system.

Referring to FIG. 1, a system 100 for a communicative network includes a server element 102 and a client element 104. The client element 104 is communicatively connected to the server element 102 by a communicative connector 106. The server element 102 is any of a wide variety of processing or communications devices, such as, for example, a computer, a processor, a circuit, memory or other element within a processor or processing device, or any device including any such matter, which server element 102 is capable of functioning to receive a communicated request and appropriately respond. The client element 104 is also any of a wide variety of processing or communications devices, such as, for example, those previously mentioned, which client element 104 is capable of sending or causing the sending of a request and receiving a communicated response. The communicative connector 106 is any of a wide variety of communication channels and elements therefor, including, for example, a wire, a circuit, a bus, a cable, a wired or wireless communications network, or any other device or component that allows for communications, electrical or otherwise, between elements functioning to communicate in a client-server manner. For purposes hereof, a client-server system or function is to be broadly construed to include any and all communicative arrangements in which elements, devices, or components intercommunicate, directly or through intermediary systems, by generation of a request, receipt of the request, generation of a response, and occurrence of the response. The client-server system and function, as so construed, includes client-server operations over a network, such as the Internet or World Wide Web, another wide area network, a local area network, and even within a device among elements, components, or peripherals of the device, such as within a single computer or other processing device.

In operation, the system 100 operates, at least in part, in a client-server manner, such that the client element 104 delivers a request over the communicative connector 106 to the server element 102. The server element 102 receives the request and directly or indirectly processes it. The server element 102 then appropriately responds to the request, for example, by communicating a response signal back to the client element 104 over the communicative connector 106. Although the communicative connector 106 is illustrated in FIG. 1 as a simple line connection between the client element 104 and the server element 102, it is to be understood that the communicative connector 106 can be any of a wide variety of communicating intermediate devices, connections, and elements of a network or system that are communicatively connected to enable inter-communications in the client-server manner just described. For example, the communicative connector 104 in certain embodiments is the Internet and each of the client element 104 and the server element 102 is a separate, disparate processing device connected to the Internet. Of course, as has been more fully described, all other network or interconnection of devices or components is possible and included within the scope of the embodiments.

Figure 2:
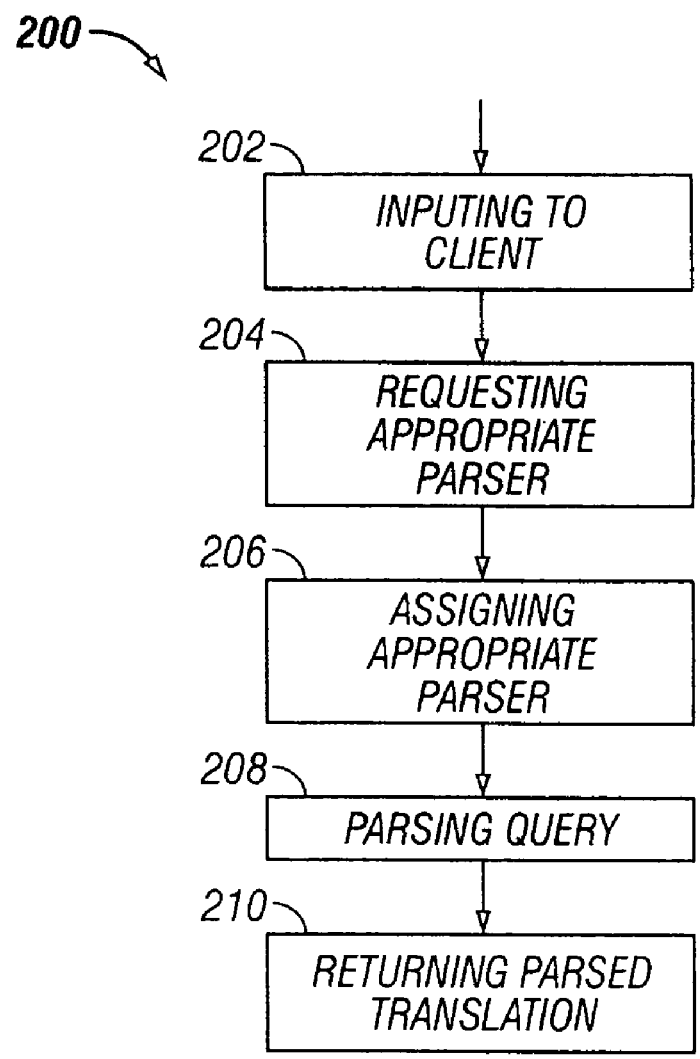
FIG. 2 illustrates embodiments of a method of operation of the client-server system of FIG. 1, providing a multi-user, multi-device, geographically disparate communications system having a natural language interface.

Referring to FIG. 2, a method 200 operable on the system 100 of FIG. 1 includes a step 202 of inputting a query or command to a client. In the step 202, for example, a human user inputs, via input components such as a keyboard to a computing device as the client, a database or other application query in a natural language, such as English grammar and lexicon, through a natural language interface (NLI). In a step 204, a request is made, such as via the client to another device, for example, a server, for an appropriate parser for parsing the particular NLI input of the step 202.

Referring to FIGS. 1 and 2, in conjunction, if, for example, the method 200 operates on a system 100 that includes the Internet as the communicative connector 106 between a client element 104 and the server element 102, the step 202 of inputting is performed at the client element 104 and the step 204 of requesting an appropriate parser is communicated over the communicative connector 106 to the server element 102. The server element 102 can maintain or make accessible a selection of parser from among one or more parsers of a so-called "parser farm". In this manner, an appropriate parser for the particular input from the client element 104 is useable, and the parser need not (although it may be) available in or at the client element 104 itself. In the trade, the term "thin client" is sometimes used to refer to a client in a client-server system which does not itself have substantial processing or operative capability within the client, and such thin client relies on other units, such as a server, for processing and operative capabilities available on the client's request. The method 200 is particularly applicable to such thin client environments, as those skilled in the art will understand and appreciate.

Continuing to refer to FIG. 2, a step 206 of the method 200 assigns the appropriate parser for parsing the input of the step 202. The appropriate parser, in any instance, will depend on several variables, including, for example, the numbers and types of parsers available for the application and the particular system 100 and method 200 capabilities and operations. Selection of parsers among several choices is subject to many possibilities. On selection of the parser in the step 206, the parser in a step 208 performs a parse of the query or command input in the step 202. The step 208 is repeated until a well formed grammar constituent is specified. Once the parse in the step 208 is completed, a step 210 returns a translation from the parser of the parsed query or command.

Referring to FIGS. 1 and 2, in conjunction, in a possible example in which the method 200 operates on a system 100 that includes the Internet as the communicative connector 106 as previously mentioned, the appropriate parser requested and chosen in the step 204 is resident on or available via the server element 102. The client element 104 in such example is, therefore, a thin client in that significant processing operations, at least with respect to the guided language query operations of the method 200, occur on or through the server element 102, not the client element 104.

Architecture

Figure 3:
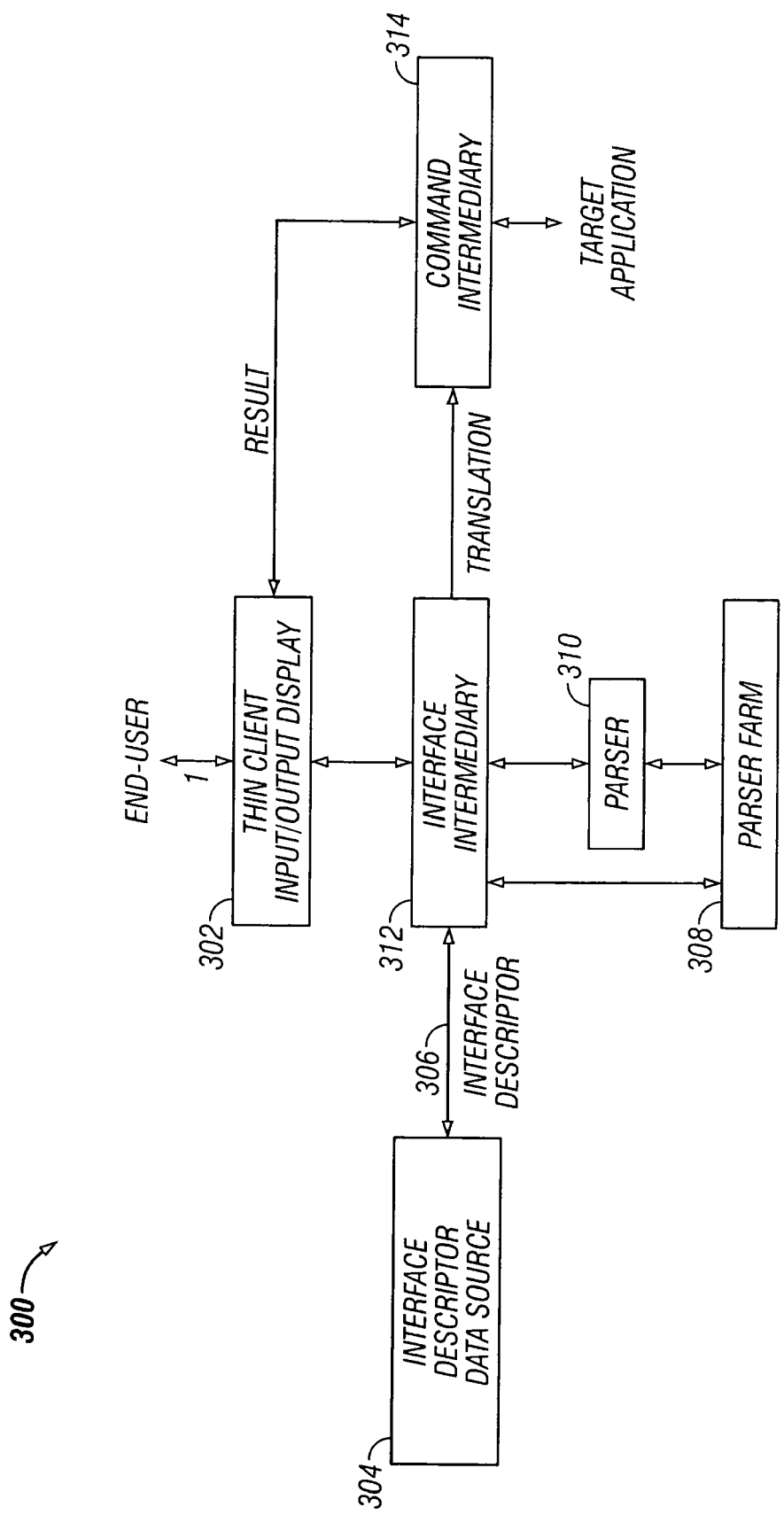
FIG. 3 illustrates embodiments of a system for a natural language interface over a network of multiple and geographically disparate users and devices, such as the Internet.

Referring to FIG. 3, an implementation 300 of the system 100 of FIG. 1 includes a thin client 302, for input by and output display to a user, such as a human computer operator. The thin client 302 can be, for example, a personal desktop computer, a notebook computer, a network computer, a personal digital assistant, a network-enabled telephone, a dumb terminal, a smart phone, a set top box, a Palm™ device, a toy controller, a remote control and any other device having functions of input and request communication. The user of the thin client 302 is most likely a human user, however, it can alternatively be a software or hardware agent which interacts with the thin client 302 to input and receive responses.

Maintained on the thin client 302 can be a host application (not shown), such as a software program, embedded program, or hardware functional unit, which initiates a communicative interaction by the thin client 302 with other elements of the implementation 300. Examples of host applications are a web browser, Microsoft Word™, or a specialized or other stand-alone application.

In addition, the thin client 302 can include a target application (not shown) that receives a translation (as hereafter described) of a query or command corresponding to the input to the thin client 302 and returns results (as hereafter described), including status messages, for example, for display on the thin client 302. The target application can be included in or the same as, or different or distinct from, the host application of the thin client 302. Several exemplary types of target applications include database management system (DBMS) systems, word processors, game programs, robots with sensors and feedback, toys, video cassette recorders (VCRs), military equipment, and other machines and devices with software interfaces.

The thin client 302 can include various elements, including, for example, an input/output display that the user can use to construct queries and commands and view results. The thin client 302 can be any of a variety of presently available and even future applications and devices, for example, as simple as a web page with no onboard processing, where the query or command then-input by the user plus choices for next inputs are displayed, or the thin client 302 can be implemented using compiled, interpreted, or scripted languages such as C/C++, Java, or Javascript. The thin client 302 can even be generated on-the-fly, such as by an interface intermediary 312 hereafter discussed. Moreover, depending on the particulars of the implementation 300, the thin client 302 can run or operate as an independent process or within another environment (not shown), such as a web browser, or as a plug-in or extension within another application (not shown).

The implementation 300 also includes an interface descriptor data source 304. The interface descriptor data source is software or hardware that performs logical operations and memory for locating and accessing one or more interface descriptors 306. Each interface descriptor 306 is a data structure that describes a guided interface, such as a NLI, of the implementation 300. For example, the interface descriptor for the particular guided interface can have the format:

<LL properties, grammar, lexicon, portable specification, experts, translations>.

Of course, other formats are possible to achieve the same objective of describing the particular guided interface that is appropriate to the implementation 300, for the particular user and thin client 302.

In operation of the implementation 300, the interface descriptor 306 (or a reference, direct or indirect, to the interface descriptor) is found, located, derived, or otherwise presented or obtained by the interface descriptor data source 304. For example, the interface descriptor data source 304 can obtain the interface descriptor 306 on a web page or possibly from the interface descriptor data source 304, itself. The interface descriptor data source 304, upon locating or otherwise obtaining the relevant interface descriptor 306 makes the interface descriptor 306 available to the implementation 300, such as by sending the interface descriptor 306 (or a reference or handle to it) to a parser farm 308 in order to initialize an appropriate parser 310, as hereinafter further detailed. Exemplary types of the interface descriptor data source include traders, databases, search engines, and other logical operators and applications.

An interface intermediary 312 also is included in the implementation 300. The interface intermediary 312 interacts with the thin client 302, the interface descriptor data source 304, and the parser farm 308 and parser 310. The interface intermediary 312 functions to directly interact with the parser 310, including by receiving next items to display as dictated by the parser 310 and preparing displays dictated by the parser 310 for the thin client 302. The interface intermediary also receives selections from the thin client 302 based on input thereto and generations by the thin client 302, and delivers or returns these to the parser 310. The interface intermediary 312 can be part of or inherent in the thin client 302 and its operations or, alternatively, separate from the thin client 302 at the location of the thin client 302 (such as a peripheral or application to the thin client 302), on a separate, disparate server device, or otherwise. Location of the interface intermediary separate and distinct from the thin client 302 lessens download burdens and processing requirements of the thin client 302.

The parser farm 308 of the implementation 300 serves to manage one or more of the parsers 310 available to the thin client 302 via the interface descriptor data source 304 and interface intermediary 312. The parser farm 308 manages the parsers 310 as a database or other access source, either by assigning or dictating use of an existing parser 310 of or available to the parser farm 308 or by creating or generating a new parser 310 and assigning or dictating use of the new parser 310 for the implementation 300 and its operation. The parser farm 308 can, for example, make available for use the new parser 310, by returning to the implementation 300 an applicable handle or other locater for the parser 310.

The parser 310 of the implementation is a program or other sequence of steps or logical operations that receives input in the form of sequential source program instructions, interactive online commands, markup tags, or some other defined interface and breaks them into parts (for example, the nouns (objects), verbs (methods), and their attributes or options) that can then be managed by other programming or elements (for example, other components of an application or device). The parser 310 can also check to see that all input has been provided that is necessary. In the implementation 300, the parser 310 is initialized based on the interface descriptor 306 from the interface descriptor data source 304.

Once the parser 310 is so initialized, the parser 310 generates a choice list, accepts a choice, and iterates. The parser 310 can, but need not necessarily, operate by creating a parse tree, as is common. In such case, the parser 310 employs the parse tree to generate translations of the parser 310 related to the parse tree. The implementation 300 can support an extensible collection of kinds and types of parsers, including, for example, the NLMenu parser mentioned in the background description.

Another element of the implementation, a command intermediary 314, accepts translations output by the parser 310, sends the translation to the target application, receives the result, and interfaces and manages interactions between the target application and the input/output display to the user. Additionally or alternatively, the parser 310 routes the result to some other external application, element or process (not shown) for processing or display. The command intermediary 314 is a software or hardware program or logical operator that can be included in thin client 302, a server device, or other software or hardware. Moreover, the command intermediary 314, or aspects thereof, can be included in the interface intermediary 312 or other elements.

One or more communications networks connect and interconnect the foregoing elements of the implementation 300, including the processes and operations thereby. In particular, the thin client 302 is communicatively connected with the interface intermediary 312. The interface intermediary 312 is communicatively connected to the interface descriptor data source 304. The interface intermediary 312 is also communicatively connected to the parser farm 308 and the parser 310. The parser 310 is included in or otherwise communicatively connected to the parser farm 308. The command intermediary 314 is communicatively connected to the interface intermediary 312 and the thin client 302. Particularly, the command intermediary is communicatively connected to the target application resident in the thin client 302 or otherwise, as the case may be. The communications network or networks connecting such elements are wired, wireless or other communications channels. The communications over the network(s) can conform to standardized or specialized protocols and formats for communications, including various transport protocols, such as, for example, Transport Control Protocol/Internet Protocol (TCP/IP). The protocols and formats are employed in the network(s) to transport messages, including commands, queries, and other information and data, in various formats from sending processes, elements and functions to receiving processes, elements and functions among the elements of the implementation 300. The communications include security protocols to secure transmission of the messages, where and when appropriate or desired.

Operation

In operation, the thin client 302 of the implementation 300 communicates with the interface intermediary 312 to interact with the parser 310, as well as the interface descriptor data source 304, the parser farm 308 and the command intermediary 314. The thin client 302 also communicates with the command intermediary 314 with regard to results. These interactions of the thin client 302 will always occur via the client device the user is interacting with as the thin client 302. All other operations of the implementation 300 can occur on local or remote systems and units of the network(s), or in certain cases on the thin client, itself. For example, the interface descriptor data source 304, the parser farm 308, the parser 310, the interface intermediary 312, and the command interface 314 can be any of various processing and communications units and components, including PCs, handheld devices, portable phones, or other electronic devices. In addition, during execution, certain functions of these elements 304, 308, 310, 312, and 314 can occur among the various elements and can even migrate among them. It is to be understood that there are numerous possible physical permutations of configuration of the implementation 300, including that the functions of the elements 304, 308, 310, 312, and 314 can be performed and located throughout the network(s) and systems mentioned herein and in any of a variety of combinations thereof.

Figure 4:
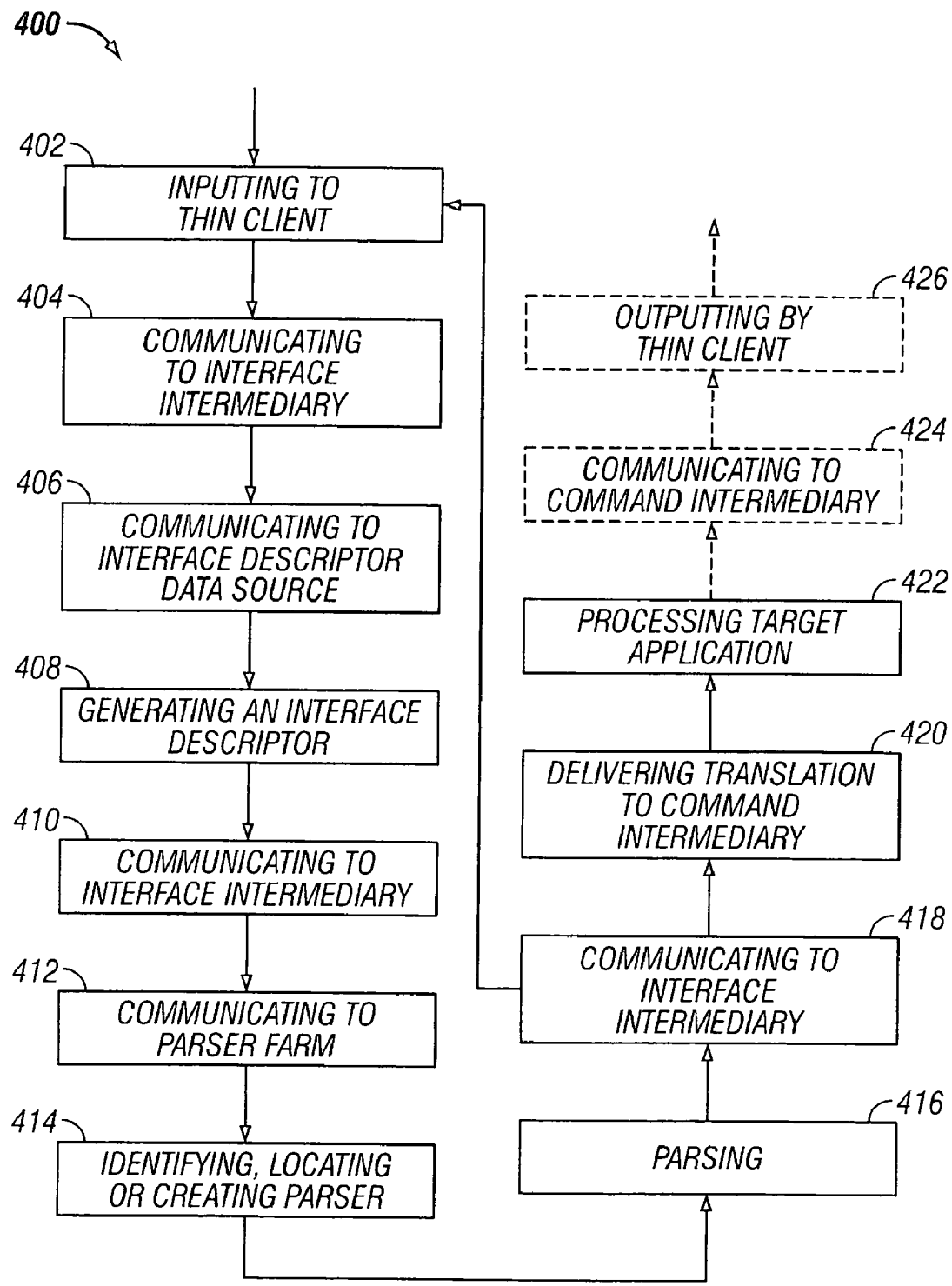
FIG. 4 illustrates embodiments of a method of a natural language interface over a network of multiple and geographically disparate users and devices, such as the Internet.

Referring to FIG. 4, in conjunction with FIG. 3, the implementation 300 in various possible configurations and arrangements operates according to a method 400. The method 400 is commenced by a step 402 of inputting to the thin client 302. In the step 402, the user interacts directly with the thin client 302, for example, via an input/output display. The user also interacts, via the thin client 302, indirectly with the interface intermediary 312. In particular, the thin client 302, in response to the inputting step 402, communicates in a step 404 with the interface intermediary 312. In effect, the thin client 302 interacts with both the user and the interface intermediary 312 in the step 404 in order that appropriate query or command input is delivered by the user. For example, the thin client 302 can require some configuration data stored within the interface descriptor 306, or other specific information or formatting, and can acquire this directly (e.g., from a web page) or indirectly by the interface descriptor data source 304 via the interface intermediary 312.

In a step 406, the interface intermediary 312, through the interactions with the thin client 302, communicates with the interface descriptor data source 304 as just mentioned. The communication with the interface descriptor data source 304 serves to indicate to the data source that an interface descriptor 306 is required and one is to be located. The interface descriptor data source 304 operates in a step 408, either directly or through other features as previously described, to generate, obtain, locate, create or otherwise make available the appropriate interface descriptor 306. Because of the interactions of the user with the thin client 302 in the step 402, and the corresponding interactions and communications among the thin client 302, the interface intermediary 312, and the interface descriptor data source 304 in the steps 404, 406, and 408, the appropriate interface descriptor 306 corresponds to the user's input query or command of the step 402.

In a step 410, the interface descriptor 306 is communicated to the interface intermediary 312, via communications of the interface descriptor data source 304 with the interface intermediary 312. The interface intermediary 312, in a step 412, then communicates with the parser farm 308 in order that the parser farm 308 identifies, locates or creates the appropriate parser 310 in a step 414. In the step 414, the parser farm 308, based on the particular interface descriptor 306 and actions of the interface intermediary 312, causes a selection of the appropriate parser 310. The interface descriptor 306 initializes the parser 310 to receive the query or command input in the step 402 by the user.

The parser 310 then performs a parse of the query or command in a step 416. The step 416 and its performance will depend upon the particular parser 310 for the operation, as dictated by the interface descriptor 306, parser availability via the parser farm 308, and other variables. In a step 418, the parser 310 communicates with the interface intermediary 312 in order that the interface intermediary 312 in communication with the thin client 302 presents the user with the next choices of the language for the query or command for further inputting in return to the step 402. Upon complete input of the query or command through the steps 402–418, and repetition as necessary, the entire query or command is parsed on receipt of a request therefore by the parser 310.

In a step 420, a translation corresponding to the particular query or command so parsed, is delivered from the parser 310, via the interface intermediary 312, to the command intermediary 314. The command intermediary 314, in a step 422, interacts with the interface intermediary 312 to receive the translation and with the target application of the thin client 302, or otherwise as the case may be, to send the translation for operation by the target application and generation and return of a result. Additional steps 424 of communicating the result from the target application to the command intermediary 314 and steps 426 of outputting the result through communications between the command intermediary 314 and the thin client 302 are also possible. The communicated result delivered to the thin client 302 can be delivered to the user, for example, through an input/output display such as a monitor or otherwise.

In addition to the foregoing steps of the method 400, the method can include additional or alternate steps, as appropriate in the circumstances and as the case may be. One added step or series of steps include a so-called expert functionality. An expert functionality is, for example, a process that is invoked during parsing, possibly accesses a data source to receive possible sentence completions, displays these completions to the user, receives a selection from the user and returns a phrase for the sentence and a translation fragment. The expert's data source can be the target application, or some other source. Such an expert can require initialization files, and the behavior of the expert can be parameterized at runtime or otherwise.

EXAMPLE

The following is a specific example of the foregoing systems and methods. The specific example herein is referred to as the LingoLogic™ (LL) System, which has been developed by Object Services and Consulting, Inc., assignee hereof.

Figure 5:
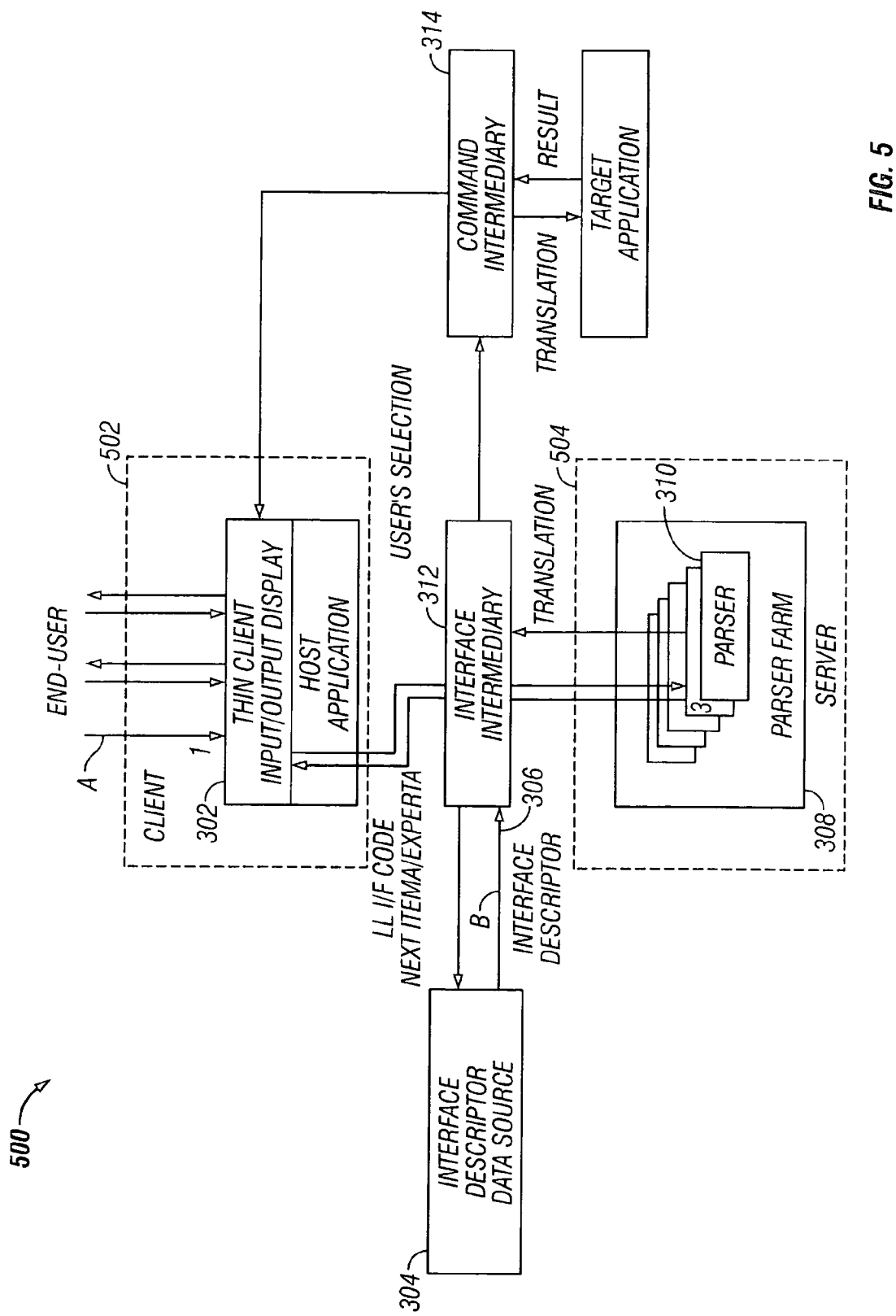
FIG. 5 illustrates embodiments of a natural language interface system, as found in one such exemplary system referred to as the LingoLogic (LL) system.

Referring to FIG. 5, a method 500 of the LL system includes certain steps performed by a client device 502, certain other steps performed by a server device 504, and certain other steps performed by either the client device 502, the server device 504, or some other device or system (not shown). In particular in the LL system and the method 500, the client device 502 includes features of the thin client 302, previously described with reference to FIG. 3, and also includes at least a host application, such as a software operating system of the client device 502. The server device 504 in the LL system and the method 500 includes features of the parser farm 308 and the parser 310, previously described in reference to FIG. 3. The interface descriptor data source 304, the interface intermediary 312, and the command intermediary 314, each previously described with respect to FIG. 3, can be included in the client device 502, the server device 504, in combinations thereof, and in other devices and features (not shown) in combination or otherwise as appropriate for the application and environment in which the LL system and the method 500 are employed. A possibility is that each of the interface descriptor data source 304, the interface intermediary 312, and the command intermediary 314 are included in the server device 504, in order that the client device 502 remains as thin as possible. Although this is one possibility, it is expected that there are circumstances in which such features will be advantageously included in the client device 502, in combinations, or in other devices. Furthermore, it is anticipated and possible that the features will be included in designated devices 502 or 504 or others, on configuration or run-time, such that, for example, the parsers 310 can operate from separate remote computers on a network or communications link to collectively constitute the server device 504 or can otherwise be migrated to the client device 502 or other machines in whole or part. Other configurations or arrangements for the LL system and the method 500 are possible.

Continuing to refer to FIG. 5, the method 500 commences when the End-User interacts (A) with a Host Application 506 of the client device 502 that supports LL, for instance, a browser like Netscape™ or Internet Explorer™, a LL-enabled application like Microsoft Access™ or Word™, or a stand-alone LL application. The End-User selects a LL URL, an avatar (shown in FIG. 6), an application menu, or uses some other mechanism, which initializes the LL system and the method 500. Corresponding to the selection is a LL Interface Descriptor (B), as defined in more detail below, which is sent to the Parser Farm 308 on the server device 504. The LL Interface Descriptor (B), if not local (e.g., stored on a web page) to the server device 504 is found in the Interface Descriptor Data Source 304, which can be remote (e.g., discovered by a search engine, found in a DBMS, or otherwise in or by the server device 504). The Interface Descriptor Data Source 304, or its parts, can be remote from the server device 504, accessible by reference, or some other means, as is common.

At the server device 504, the Parser Farm 308 assigns or creates and then initializes the Parser 310 using the Interface Descriptor (B) as input. The Parser 310 generates an initial set of choices, and sends them to the Interface Intermediary 312 along with a Parser ID (not shown in detail). The Interface Intermediary 312, which can be included in the thin client 302 of the client device 502 or server device 504 (as previously mentioned as possibilities), downloads or contains LL interface code (e.g., HTML, Javascript or applet) constituting the input display of the Thin Client 302 along with the initial set of choices for query or command to be input or selected at the client device 502 by the user.

The Thin Client 302 displays the various choices to the End-User. Referring to FIGS. 6–11, several examples are provided of possible alternatives for the user interface and menus for display at the Thin Client 302 of the LL system. Of course, the examples are just that, and other displays and interfaces are possible.

Figure 15:
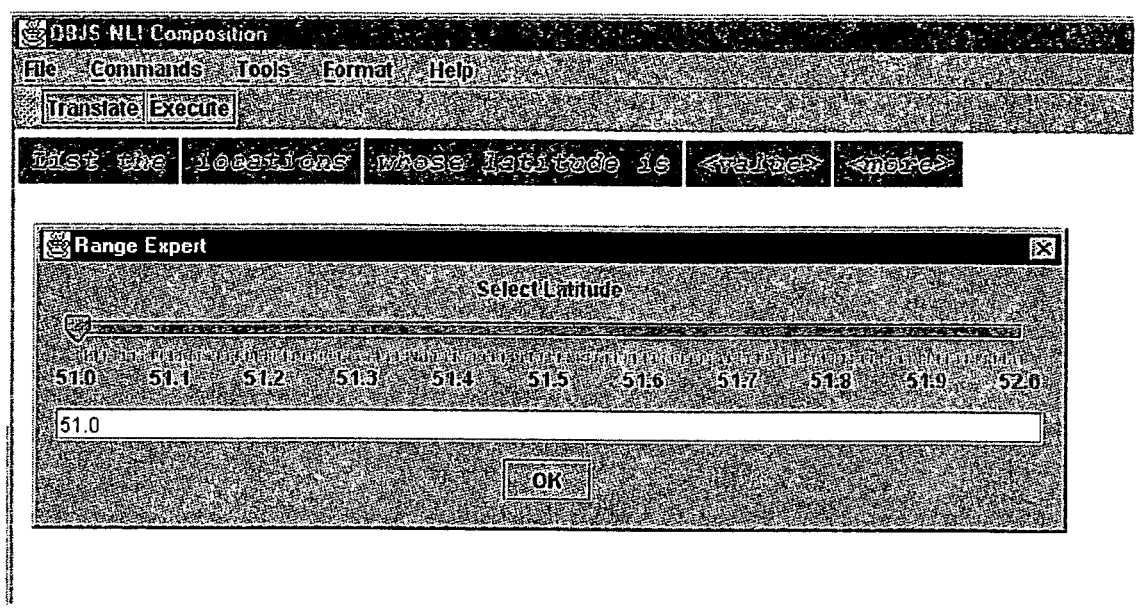
FIG. 15 illustrates embodiments of a simple expert used to specify a value in a query or command of a natural language interface system.
Figure 16:
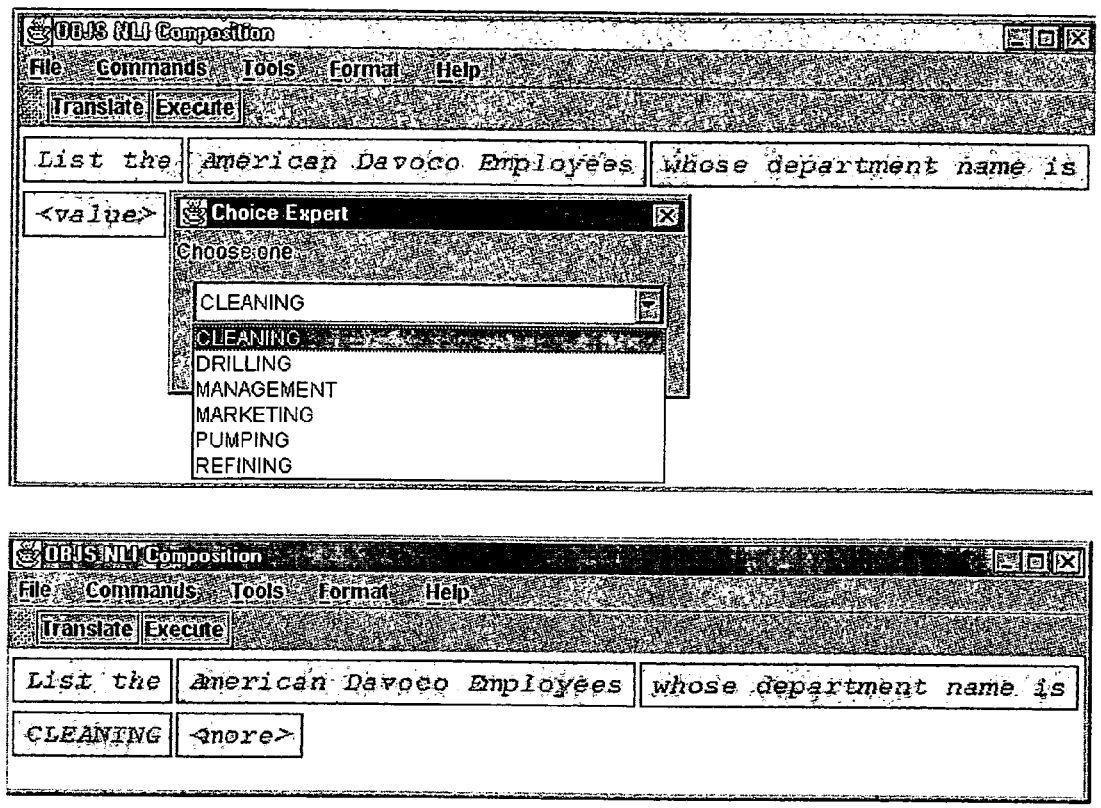
FIG. 16 illustrates embodiments of a data source expert used to specify a value in a query or command of a natural language interface system, wherein the value is shown during and after invocation of the expert.

The End-User selects one of the menu choices, which can, but need not necessarily, include a selection from an Expert of the type previously described. Referring to FIGS. 15–16, exemplary screen shots of the user interface at the Thin Client 302 of the LL system are shown for Expert selection and properties. Interactions with experts such as the Expert, although not shown in detail in FIG. 5, are similar to interactions with the Command Intermediary 314 in that the experts can access the Target Application or other information sources to retrieve values.

Upon the End-User's selection from the menu choices, the selection is sent to the assigned Parser 310. The assigned Parser 310 parses the selected item and returns a list of next choices to the Thin Client 302. These steps of selection and parsing, with return of next choices, are repeated until a complete sentence (i.e., a complete query or command in the particular guided natural language of the LL system) is formed. When the complete sentence is formed, the user can select some operation, e.g., Execute, Show Parse, Show Translation, at the Thin Client 302. This command is sent to the Parser 310 via the Interface Intermediary 312.

Figure 17:
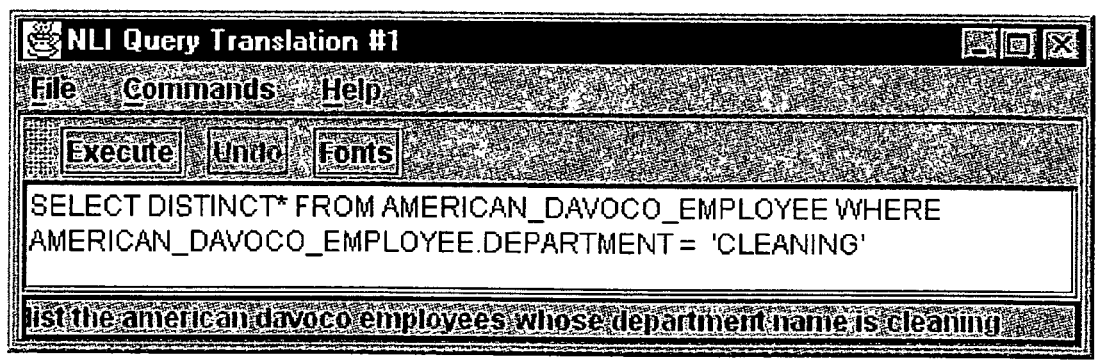
FIG. 17 illustrates embodiments of a translation of a sample query into SQL, in accordance with a natural language interface system, such as the LingoLogic system.

If the command is Execute, the sentence is translated. An example result of a Translation (where the target language is SQL) is shown in FIG. 17. The resulting Translation is sent to the Command Intermediary 314. The Command Intermediary 314 sends the translation to the Target Application for processing. The Target Application generates and returns a Result (answer, status of action, or other response). The Result is displayed on the end-user's machine, for example, the client device 502, in the Output Display for the Thin Client 302, such as the monitor or other display of the client device 502. An example screen shot of an Output Display of the LL system is provided in FIG. 18.

Further details and variations of the LL system, the method 500, and the steps and features are described below.

Thin Client

The Thin Client 302 provides or makes available Input and Output Displays that are typically located on the client device 502 that includes the Thin Client 302. The End-User controls the client device 502 and attributes, properties and operations of the Thin Client 302. The Interface Intermediary 312 and the Command Intermediary 314 and their processes are located in the client device 502 or the server device 504. Certain functions of the devices 502, 504 and the included features and processes are now discussed.

Input Display

There can be multiple LL displays to the same or different Interface Descriptors 306 displayed on a single web page or application display (e.g., a LL weather interface, a LL restaurants interface, both on the same page).

The Thin Client 302 has an input display user interface on the client device 502 which has an initial appearance, an appearance during sentence construction, a means of selecting completion items, including possibly via speech, and the sentence displays can be edited.

Initial Appearance

Figure 6:
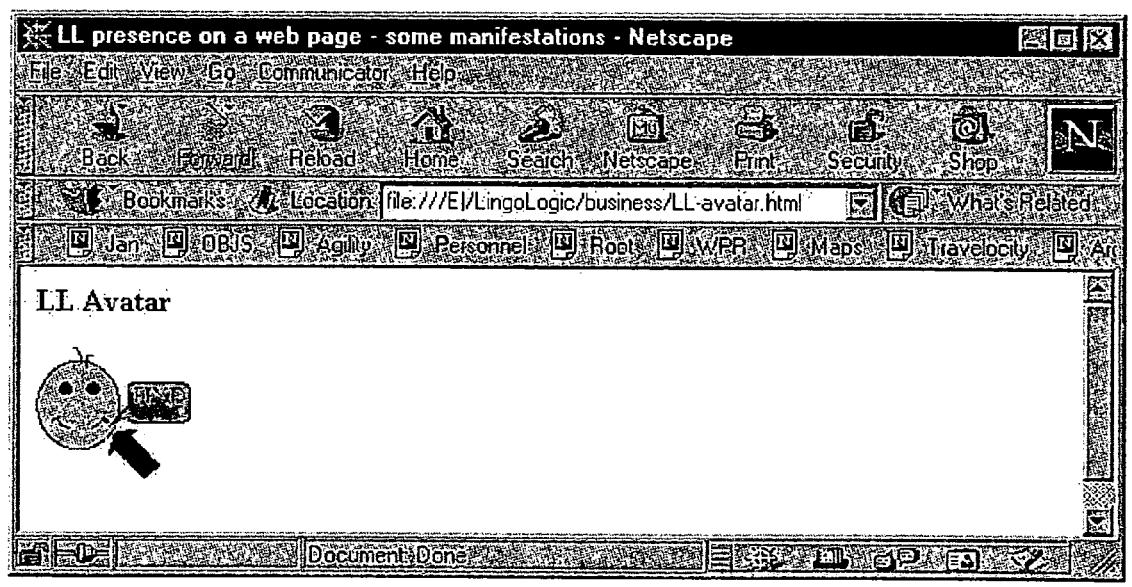
FIG. 6 illustrates embodiments of a distinctive avatar employed to initiate a query or command of the natural language interface system of FIG. 5.
Figure 7:
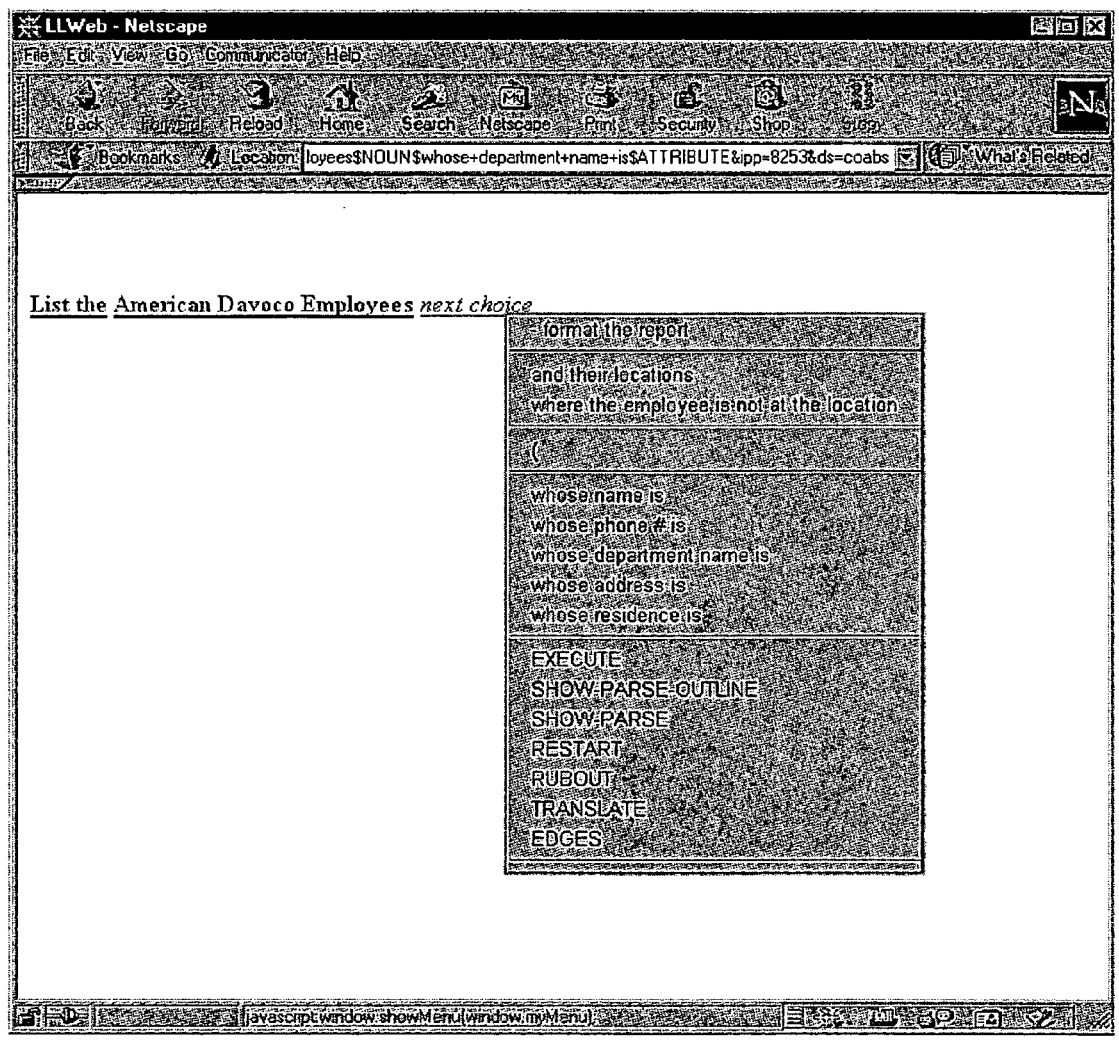
FIG. 7 illustrates embodiments of a sequence of web-links and a popup menu used to specify a query or command of the natural language interface system of FIG. 5.
Figure 8:
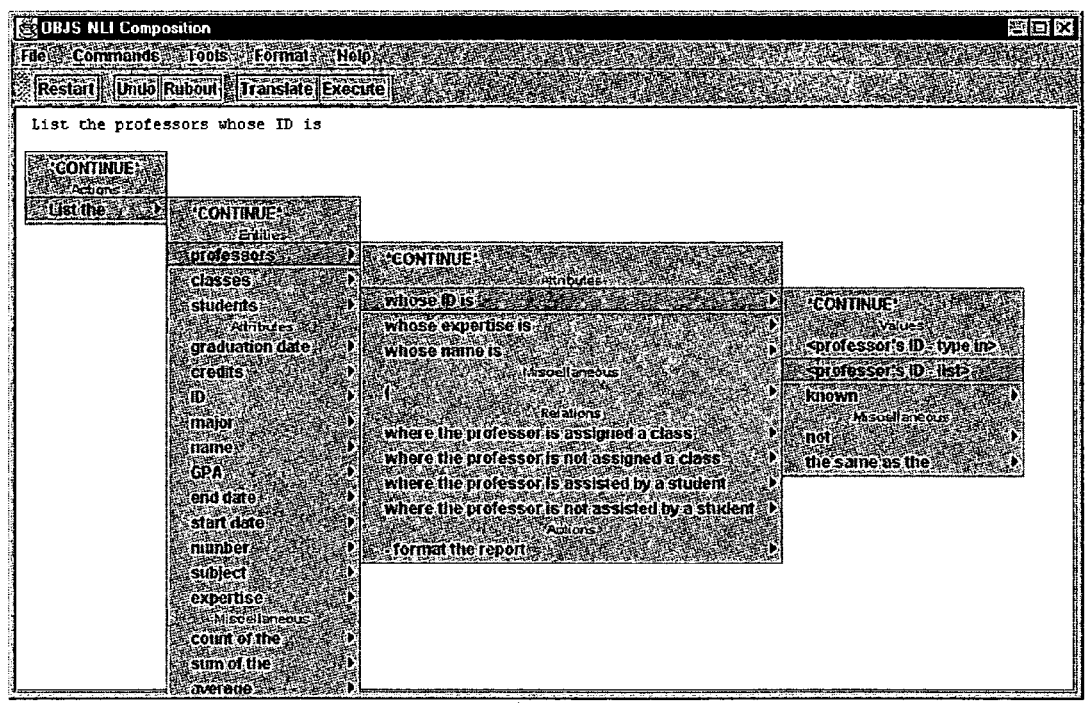
FIG. 8 illustrates embodiments of a cascading menu used to specify a query or command of the natural language interface system of FIG. 5.
Figure 9:
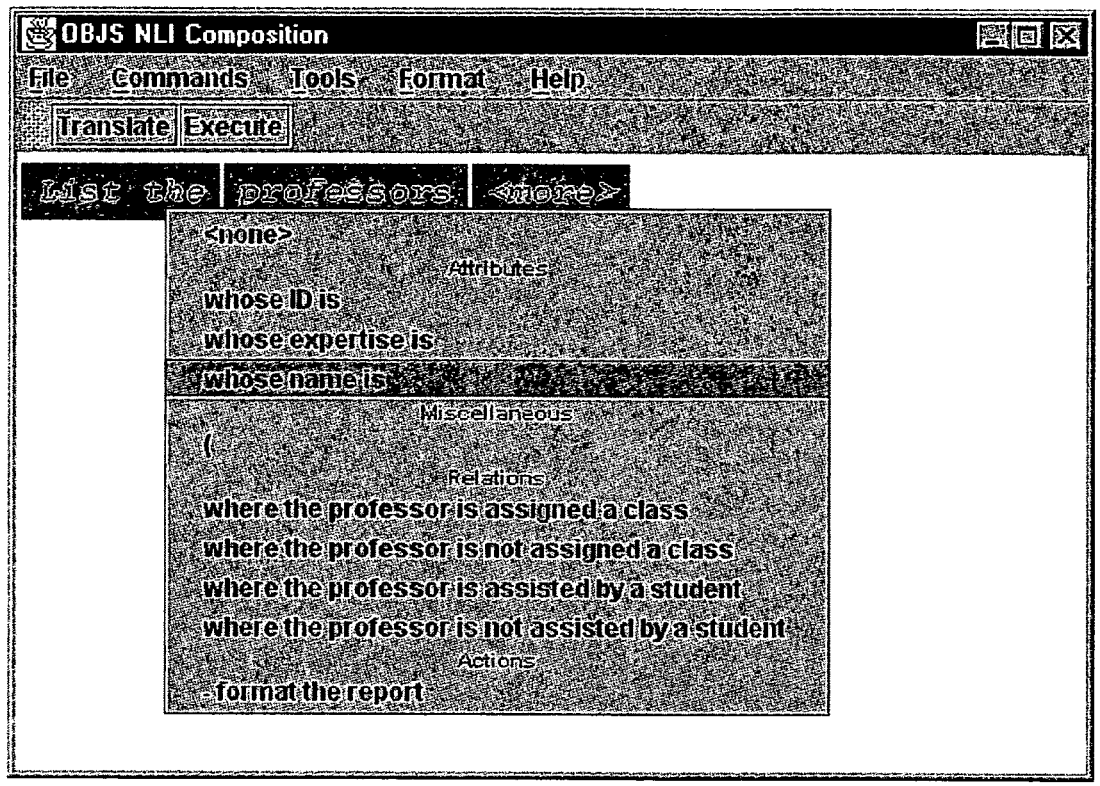
FIG. 9 illustrates embodiments of phrase buttons used to specify a query or command of the natural language interface system of FIG. 5.
Figure 10:
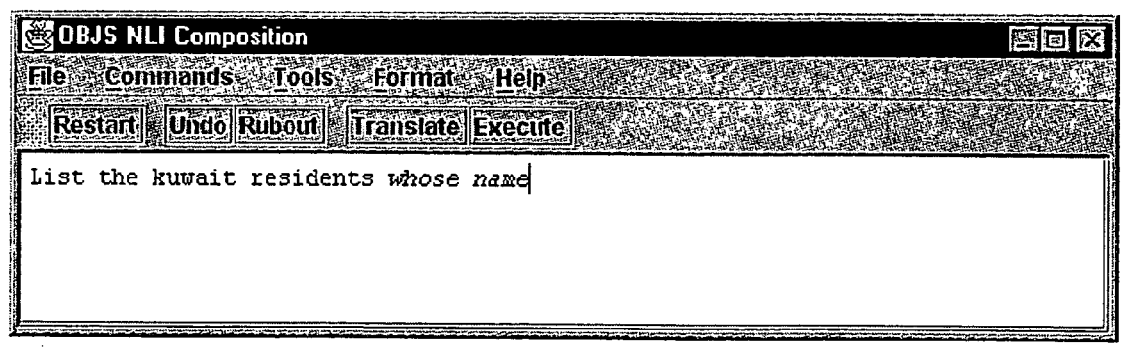
FIG. 10 illustrates embodiments of a type-in display used to specify a query or command of the natural language interface system of FIG. 5.
Figure 11:
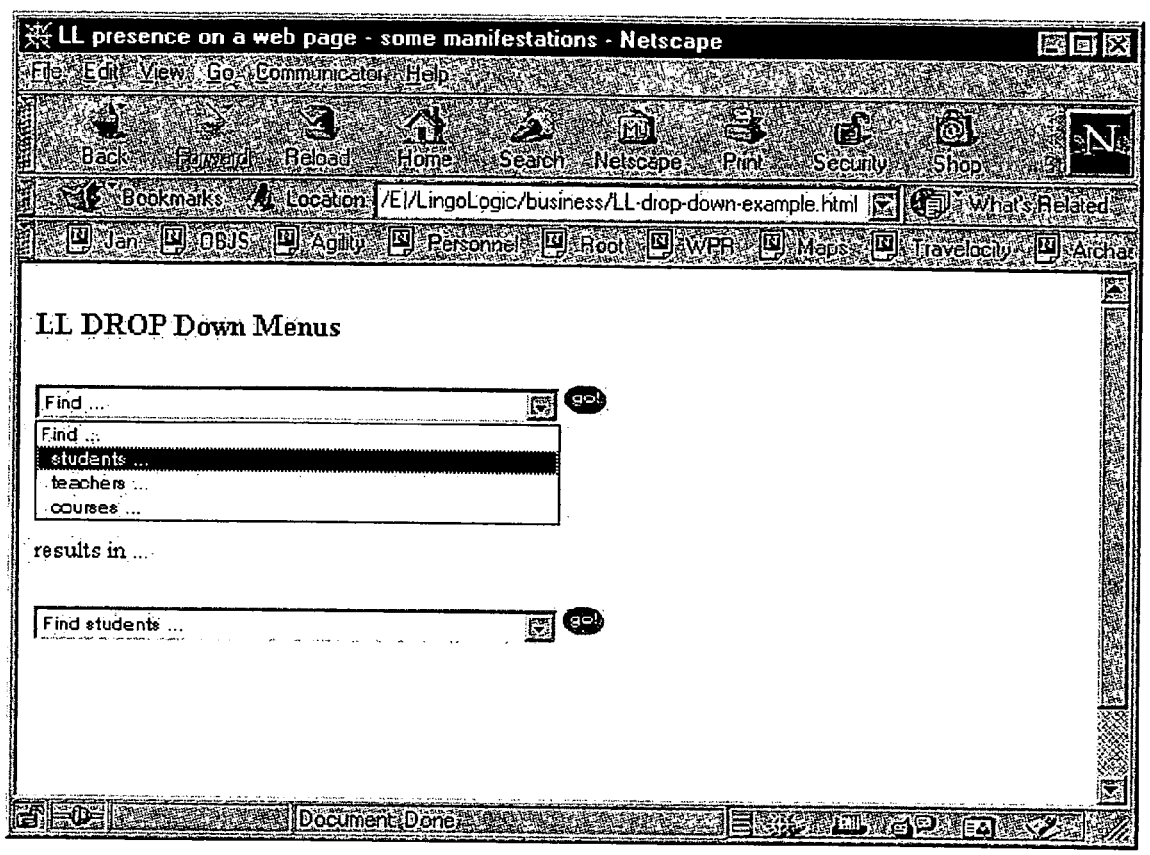
FIG. 11 illustrates embodiments of a drop down menu used to specify a query or command of the natural language interface system of FIG. 5.

There are several ways in which the Thin Client 302 user interface can initially manifest itself on the end-user's client display (for example, during the step 402 shown in FIG. 4). Some possibilities include:

distinguishable image or avatar, possibly a .gif associated with a link (shown in FIG. 6). An important special case of a LL-enabled image is a banner ad that appears on a web page. When the mouse appears over a LL-enabled banner ad, a LL interaction ensues.

navigating a link, e.g., a URL, on a web page (shown in FIG. 7)

phrase button, e.g., "Find . . . " (shown in FIG. 9)

text typein menu, perhaps with <type query here> or "Find . . . " indicated (shown in FIG. 10)

drop down menu (of the kind often used for States selection on the web) (shown in FIG. 11)

Other possibilities not shown in Figures include:

pull-down menu [e.g., as in a desktop application] with sentence start indicated, e.g., "Find . . . " or "Delete . . . "

outline menu contracted to show a <new query> node that can be selected explicit call to a LL Interface Intermediary from an application to return initial choices (program-to-program)

Appearance during Sentence Construction

Once initiated, the Thin Client 302 provides a user interface that appears as follows while command is being specified (for example, during the steps 404–416 shown in FIG. 4).

sequence of web-links and a popup menu (shown in FIG. 7)

cascaded menu display where user selects an item, subitem possibilities are displayed and when user selects one of these then further subitem possibilities are displayed and so on. (shown in FIG. 8). Cascaded menus can result from selecting an item like "Find . . . " from a pull down menu in some application or from an initial mouse click on an avatar or using some other initial display.

sequence of phrase buttons illustrating the sentence constructed so far with a menu showing next possible selections. (shown in FIG. 9)

typein menu where user types text but wherein the guiding ability is still present to insure only legal completions are specifiable (e.g., bell or display, such as underlining, indicates items typed but not in any completion; user types? to see popup menu of legal completions). (shown in FIG. 10)

drop down menu with sentence constructed so far in the selection box and drop down elements are next choices possible. (shown in FIG. 11)

Other possible displays not shown in Figures include:

a speech driven LL interface that uses any of the displays above but selection is via speaking a menu selection rather than selecting it with the mouse.

outline menu display where a partially constructed sentence appears at the active node and, as the user selects, sub-branches appear to show choices. When a choice is made, the selection is concatenated onto the (partial) sentence at the node and next items are computed and become the new child subnodes.

explicit call to a LL program from an application to return further choices

The user or application can indicate a default display interface to use, and can alternate between the available user interfaces at runtime. It is possible in operating environments and devices which support it to use no visual interface at all, but rather interact with the system using alternate forms of interaction such as speech or gesture, but typically in these cases, turning the LL input sentence displays back on is an end-user option.

Handling Long Choice Item Lists

Sentences (i.e., queries and commands at the Thin Client 302 of the LL system) constructed and displayed with any of these techniques can wrap and scroll in conventional ways if they extend past the boundaries of the display region. Alternative techniques can be used to optimize the presentation of choice items when the number of items is very large. Examples of such techniques include:

Item Filtration—Filtering the choice items list based upon user preferences, security access, predictive filtering based upon past user behavior/selections.

Categorization—Group items into (possibly hierarchical) sets of categories, whereby the user selects a category and is then shown the list of subcategories or choice items.

How Items are Selected

Choice items can be selected at the Thin Client 302 by several means, for instance, mouse click, typing the choice, typing numbers corresponding to a choice (possibly useful on a PDA), scrolling to a choice using a scroll button or dial, gesture-based input devices, or speaking a choice in a variant of LL interfaced to a speech recognition system, or a combination of any of these.

Item Selection in the Character Typein Input Display

In the case of character input, as the user enters characters (e.g., via keyboard, touch screen monitor, speech), choices in the choice list not containing those characters or character sequences can be eliminated (choice narrowing occurs) until a unique choice is determined and completion can be requested; characters or character sequences entered which do not belong to any possible choice could result in an empty list of choices, and the characters are visually identified as illegal by altering their displayed appearance (e.g. underlining, half tone, or other means), or some other method for notifying the user of illegal entries could be used.

Speech Input

An alternative to device-based choice item selection is the use of speech. A speech interface enables the user to speak choice item selections. These spoken selections are then processed as if they were selected by any other means previously described. The choice items which are valid at a given point during sentence construction can be displayed within the interface (in a simple list, cascading menu, or any other interface described herein), spoken to the user, printed in a document, or even hidden (not displayed) if the user is experienced and recalls the valid choice items.

The speech system may or may not have knowledge of the valid choice items. Alternative implementations include:

- Synchronized ("on demand") Delivery. The speech system receives the list of valid choices at the point in time that those choices are valid. The speech system can cache the list in case it is required later to reduce communication costs and latency, or it can be sent the list every time the list is valid.
- Batch Delivery. The process which delivers the choice lists (either a client process, or a parser process) delivers either all lists, or some subset of all lists to the speech system for local caching. The lists can be encoded in a specialized or otherwise optimized format, and possibly independently retrieved by the speech system using a data source reference computed internally, or provided externally.
- No delivery. The speech system reports back to the managing process the words it identified through speech input without knowledge of actual legal choices acceptable to the LL system. Therefore, no validation of input will occur via the speech system.

Once choices are cached (excluding the "No Delivery" model), the speech system and parser can exchange data in a more optimized format, such as using list IDs, and item selection IDs rather than their textual equivalents.

Editing the Input Display

LL sentence displays at the Thin Client 302 can be edited, but doing so requires care because modifying the interior of the sentence can make the remainder of the sentence unparsable/invalid. Still, users often specify long LL sentences and then want to make changes without starting over. To edit sentences, LL implementations can permit at least the following:

Rubout—removes the last selection made. Rubout can be accomplished behind the scenes either by reparsing the sentence up to but not including the last choice. Or by backing out of the parser data structure.

Experts—Reselecting an expert associated with some segment of the sentence constructed so far activates the expert again and allows reselection of values from the expert. Since any output of a given expert is of the same grammatical type, the sentence parse tree is not typically altered and does not usually need to be reparsed when the expert-based values are changed. If an expert selection can effect the rest of an already specified sentence or partial sentence, then it is treated the same way as in Editing sentence items (below).

Editing sentence items—Depending on the display type, by placing the cursor at some point within the sentence, the user can edit the character or item representation. In this case, the parser 310 can reparse the first part of the sentence and continue parsing as the sentence is edited. If the parser 310 cannot parse the changed or added text, or the remaining part of the sentence due to the edits made, the LL Client can highlight the unparseable/invalid text (e.g., underscored or in half tone). If and when it can be parsed, it is shown normally, that is, not highlighted. An alternative is to remove the rest of a sentence past the point of editing but that loses some context the user has specified that might have to be respecified.

Distribution of User Interface

While there are several different process distribution schemes possible using the LL system architecture, as has been described above, a user interface (having numerous implementations, and possibly supplied by third parties) facilitating interaction with the LL system will reside, at least temporarily, on the client device 502. As described in foregoing discussions, this user interface takes the form of either the Thin Client 302 or the Interface Intermediary 312 (hereafter, the process running on the client device 502 is generically referred to as the "LL Client").

How the LL Client is loaded onto the client device 502 and how long it remains on the client device 502 are implementation variables. In addition, the LL Client directly or indirectly communicates with the parser 310 and its process using one of several approaches. These variations are addressed below.

Downloading the LL Client to a Client Device

The LL Client can be software code that persistently resides on the client device 502 once loaded, or it can be downloaded from another location for each use. While not actively being used it can remain as a resident process in memory.

If the code is not resident locally at the point of invocation of a distributed LL-enabled application, downloading of the LL Client code can occur automatically being initiated by user interaction with another process. The LL Client code can take any of several forms:

- a browser plugin or application extension
- an application (e.g. written in C, C++, Java, etc.)
- an applet-like application which runs inside another application such as a browser
- a scripted document using a scripting language such as Javascript and/or dynamic HTML an otherwise encoded document using a format such as XML, or an application-specific encoding
- an HTML document.

Alternatively, the LL Client code can be loaded and installed prior to use using traditional application installation methods.

Information Transfer to the LL Client

Once any initial configuration and setup is complete, the LL Client must acquire the lists of choice items. The client can acquire these lists from some other local or remote data source under control of a LL expert (for example, shown in FIG. 16), or more often from the parser 310. The lists can be acquired one-at-a-time on an as-needed basis, or all at one time, and can be cached once received (as when an entire lexicon is transferred to a client as part of initialization). The lists may take several forms, such as simple text, encoded text, or images which encode the choice items. The LL Client, or associated application, can render the choice lists allowing user selection in any of various ways. Several of these are illustrated in FIGS. 6–11, and other ways were earlier discussed.

If the lists are cached by the LL Client, the Parser 310 can send only a list ID rather than sending the entire list. The Parser 310 can also send the set or a subset of the Interface Descriptor 306, e.g., LL parser ID, transaction ID, or other metadata.

It is noteworthy that if the Thin Client 302 is used, the Interface Intermediary 312 acts as an intermediary between the Thin Client 302 and the Parser 310. In such cases, the Interface Intermediary 312 can assume some of the capabilities ascribed above (and below) to the Parser 310.

Information Transfer from the LL Client

In response to a selection made by the user, the LL Client sends to the Parser 310 a message indicating the selection made. This indicator may take one of several forms:

a text string with the value of the choice item.

an encoded form of the text string, including for example, encrypted or compressed formats, as well as digitized voice, an assigned value, such as a selection ID, text string abbreviation, etc. whereby the list sent to the LL Client contains not only the choice items but also associated values to be returned to the Parser 310 when a given item is selected, or whereby the assigned value is computed based upon an algorithm available to both the LL Client and the Parser 310.

a display-based location or other metadata which can be used to derive the selection made (e.g. where the selection made is computed by the Parser 310 from the click location when the choice lists are sent to the LL Client as sets of images).

Associated metadata, for example current state, other client metadata, and a subset of the Interface Descriptor 306, can also be passed back to the Parser 310.

Output Display

Output displays for the LL system and the method 500 generally depend on the application(s) being interfaced to via the LL system. The translation of a sentence (as specified in the grammar, lexicon, and experts) is treated as input to the target application, which can treat the input as data inputs or as commands to be interpreted and executed. Based on these inputs, the target application takes some action(s) which can have internal or external state or behavioral effect(s) on the application or other applications it interacts with. Generally, an acknowledgement or result is returned to the End-User's Output Display to acknowledge execution is in progress or has occurred (status messages) and the result of such execution, possibly including error messages.

How results are to be displayed is specified as part of the LL system sentence translation and controlled by the Command Intermediary 314 and its process as described in foregoing portions. In some cases, the Target Application directly displays results of its actions to the user (e.g., by returning a web page). In other cases, the externalized format of the results are sent from the application to the LL Client, for example, the Thin Client 302 of the client machine 502. Results can be of any type, e.g., text, HTML, XML, table (shown in FIG. 18), outline, tree, graph, map, streaming media. Once at the LL Client, Results can be routed directly to LL system output display functions or into desktop applications on the user's machine, e.g., text or html into a browser, database tables into a desktop database application like Microsoft Access™ or Excel™, trees into a tree viewer.

In the case of interfacing the LL system to a database, if a database result is too large to transfer to the desktop, a table viewer could be developed to display a subset of rows and columns where new rows and columns are transferred to the viewer as the user scrolls the display. An implementation can use Microsoft OLE DB and its built in rowsets and buffering to do this efficiently. Other actions can be for the user or an administrator to set limits on the size of results returned or the application can present the user with choices on how to proceed.

While execution is occurring, the LL system causes displays of a status indicator (e.g., hour glass cursor), possibly also displaying the time since the request was initiated, and status messages received from the application if any (e.g., Query being translated . . . , Connecting to DBMS . . . , Query being executing . . . , Returning response . . . ). Another alternative is for the application to return a cost estimate for a command before execution begins. This capability is dependent on the target application. If execution takes too long, the user can interrupt and terminate the request, choose to execute the request in a background mode, or the request can be terminated by the server or network connection. The user can meanwhile asynchronously initiate other LL commands or other non-LL task operations.

Server

The Parser Farm 308 (if present) and most probably the Parser 310 are each generally included in the server device 504, though these elements and their processes could alternatively be located on one or more physical computing or communications machines. The Parser 310 itself can be downloaded to the LL Client, for example, the Thin Client 302 on the client device 502, to improve parsing efficiency and reliability.

Parser Farm

By reference to the NLMenu system mentioned in the background here, that system was single user—both user interface logic and parser ran on a single machine and the parser was stateful and single-threaded.

The LL system architecture, as described in FIGS. 1, 3 and 5, is instead scalable to the Web, capable of supporting thousands of simultaneous users, grammars, and servers, and provides secure "24×7" availability. This scalability is facilitated through multi-threaded Parser Farms 308, Parsers 310, and Interface Intermediaries 312.

The Parser Farm 308 of the LL system is itself multi-threaded and handles multiple requests simultaneously. As described earlier, the Parser Farm 308 aids in the establishment of a communications channel between the LL Client and the Parser 310. Once the channel is established, the Parser Farm 308 can be bypassed as it is no longer required for the communication between the Parser 310 and the LL Client.

The LL System can even be used without the Parser Farm 308 in certain situations, e.g., when the user downloads an appropriate parser plugin so it operates locally on a LL Client, or when handles to a pre-initialized parser are provided to small groups of users that do not exceed the threading capacity of a given parser. Generally, the LL system operations employ the Parser Farm 308, however, to handle scalability and reliability.

Managing Parsers

The Parser Farm 308 can be co-located with, remote to, or a combination of both, the Parsers 310 that the Parser Farm 308 interacts with. In managing a set of the Parsers 310, the Parser Farm 308 can:

- maintain a list of Parsers 310 it is aware of (or rely on another process or data source to do so)
- manage the Parsers 310 if those parsers are not managed by other processes, e.g. exchange information such as how busy a given parser is, how much process time has been allocated on a given machine. The parser farm 308 can also terminate the parser processes after some period of inactivity
- create new Parsers 310 and processes locally and remotely, as needed
- use local or remote search engines to locate other or added Parsers 310
- provide security-related capabilities such as authentication, encryption, etc. to ensure that only valid parsers are used and that communications are protected.

The Parser Farm 308 can redirect requests to the Parsers 310 of which the Parser Farm 308 is aware, but does not manage, or redirect requests for other Parser Farms 308 to handle.

Multiple Parser Farms

A possible implementation and reason for multiple Parser Farms 308 is that each organization that hosts a web site that makes use of one or more Interface Descriptors 306 may want its own Parser Farm 308 to host queries by its own end-users rather than sharing a common parser farm with some external authority. This means management is under control of the Parser Farm 308 host. Also, such hosts may want to log and analyze Parser Farm 308 activity.

A possible implementation and reason for federating Parser Farms 308 is to permit an organization whose Parser Farm 308 activity becomes overloaded to use (e.g., purchase) extra parser capacity from a central Parser Farm 308 for peak hour use.

Establishing LL Client—Parser Connections

Each request which is submitted to a Parser Farm 308 directly, or indirectly, results in facilitating a connection between an Interface Intermediary 312 and a Parser 310 (for example, shown in FIG. 3). The initial request can originate, for example, from any of:

- a Thin Client 302,
- an Interface Intermediary 312,
- some other process, such as:
  - a web client navigating an HTTP URL to a web resource, for example, a CGI program, which directly or indirectly calls a Parser Farm 308,
  - an application, applet, plug-in, or application extension.

What occurs once the request is submitted and accepted by the Parser Farm 308 can vary depending upon the requestor, the request, and the implementation of the Parser Farm 308. Several possible scenarios are described below:

Web Client Request. When a Parser Farm 308 receives a request for a web client interface, it can return the address of the Interface Intermediary 312 (which then delivers a Thin Client 302 back to the web client). With regard to the connection between the Interface Intermediary 312 and the Parser 310, the Parser Farm 308 has either:

- established a connection to the Parser 310, or
- not yet established a connection. In this case, the Parser Farm 308 also returns to the LL Client (possibly embedded in the URL of the Interface Intermediary 312 returned) additional metadata that includes the address and port of a waiting Parser 310. This metadata is then given to the Interface Intermediary 312 and it establishes the connection itself.

Communications Channel Request. When the Parser Farm 308 receives a request for a communications channel, it returns an address and port (and possibly other metadata) to allow the requestor to establish a connection. Such a request can be made by a plug-in, applet, or application extension. The communications protocols and data interchange formats used between these processes can vary depending upon application requirements. Note that plug-ins or application extensions may be acquired through normal methods.

The means to determine which Parser 310 to connect to, and whether or not to spawn new Parsers 310 and processes (and whether the processes are local or remote) are configurable attributes of the Parser Farm 308. Such decisions can be based upon data including (but not limited to) parser process load, security, parser design (e.g. whether the parser is stateless or stateful), cost models, parser location and client location, and others.

Parsers

Kinds of Parsers

From the point of view of the LL system and the method 500, any process that provides a list of choices for display, accepts a selected item from the list, and performs some internal operation to identify a next selection of choices can be viewed as the parser. Such processes with specific properties represent alternative kinds or types of the Parsers 310. The LL system supports an extensible set of parser kinds. These include the NLMenu parser, described in the background portions here, as well as Flat Grammar Parsers, Tree Grammar Parsers, and Directory Structure Parsers. Other kinds of parsers can also or alternatively be defined. These kinds of parsers are related to kinds of grammars as described in the Grammar and Lexicon section below.

Parser Design

Depending upon application requirements (such as the number of concurrent users and the number of unique grammars) different Parser 310 implementations can run in a stateless or stateful mode, and can be single- or multi-threaded.

A single-threaded Parser 310 is capable of handling one parse request at a time. Subsequent requests while the parser is handling a request must queue and wait, or retry later. If the parser is used only to parse requests which share a common Interface Descriptor 306, the parser need only be initialized once. Otherwise, if each request uses a different Interface Descriptor 306, the parser will need to be re-initialized as part of handling the parse request. Parser initialization and re-initialization involves the parser processing the elements within the Interface Descriptor 306 to configure the initial state of the parser so it is able to parse requests for a given grammar and lexicon. For NLMenu parsers, for example, initialization is a high overhead operation; for sentence and tree grammars it is relatively low overhead.

A multi-threaded Parser 310 can handle several parse requests simultaneously. Each lightweight thread keeps track of a separate initialized state and parse tree and is capable of parsing requests which use a different Interface Descriptor 306.

The format of the LL Client request will vary depending upon whether the Parser 310 is stateless or stateful, and single- or multi-threaded.

Stateful Parsing. If the parser is stateful, then it retains the state it had after handling the last parse request.

Single-Threaded. A heavyweight process handles each request.

Single-User. In a single-user application this then requires the client to only include the next user selection in the parse request. As the parser has maintained the state since the last request this is all that is needed to advance the parse to the next state.

Multi-User. In a multi-user application each client will have its own parse state. Since the parser is stateful and would be left in a state unique to the last client who submitted a request, this requires the state of the parser to be reset prior to parsing each new request. In addition, each LL Client must re-send each of the previous user selections so that the state up to that point can be re-created within the parser, after which the client submits the new user selection.

As an alternative to requiring a client to re-parse to the current state in the parse request, the parser can cache the state for each client locally. When subsequent requests come in from a given client, that cached state can be reloaded by the parser. It is also possible that the parser generates and returns to each client as part of its reply a value representing the associated state. This value allows the parser to more quickly restore its state on subsequent requests (e.g. the value can be a state ID, or an optimized representation of a given state).

In situations where the parser state must be reset, in the simple case this requires the parser to back out of its current state by invoking a reset operation. This operation performs several tasks which result in the parser returning to its initialized state. Alternatively, to reduce the costs of this function, if the parser cached its initialized state it can then simply reload that state rather than having to invoke a reset operation.

Finally, given that a parser can only handle requests sequentially, for multi-user and multi-grammar applications, several parsers can be running simultaneously to service requests in parallel.

Multi-Threaded, Multi-User. In multi-threaded applications the Parser 310 can handle multiple users and multiple Interface Descriptors 306 simultaneously. Each lightweight thread is initialized with a specified Interface Descriptor 306, and then handles a sequence of parse requests from a single client.

Threads can be re-used once a LL Client has finished. This is most efficient when the thread is reset to its initialized state and reused with a client that requires the same Interface Descriptor 306.

Stateless Parsing. If the parser is stateless then it does not retain the state after each request. While unnecessary for single user applications, the design is the same as for multi-user applications. The stateless Parser 310 requires requests that include a Interface Descriptor 306, a representation of the current state of the parse (e.g., the items already selected), and the new user selection.

Single-Threaded. Stateless parsing has significant overhead when the entire state of a client's parse must be restored prior to handling each request. An alternative configuration has the parser cache the state of each client locally and load it as needed.

Multi-Threaded. In multi-threaded stateless applications several user requests can be handled simultaneously. In addition, each thread can handle any request since the thread does not maintain any state. As in the single-threaded case, there is processing overhead required to restore the previous state of a client (which is passed in by the client) and to process and load the Interface Descriptor 306. The optimization (caching client state) is applicable here as well.

An alternative configuration for the Parser 310 is called semi-stateful. Semi-stateful implementations are multi-threaded and multi-user. Each lightweight thread is configured to retain the initialized state of a given Interface Descriptor 306, but does not retain the state after any given parse. Instead each thread returns to its initialized state. Efficiency is gained over stateless multi-threaded configurations because each client request need not include the Interface Descriptor 306 if a thread is located and available which has already been initialized with the descriptor desired set. This reduces the processing overhead to restore the client state. In addition, if the client state is cached, the time to load this state can be lessened as it does not include state-related information on the Interface Descriptor 306 which is already stored within the thread.

Parsers no longer in use, because they have received an explicit message to terminate or they have timed out with no activity, can be terminated or can have their state reset, ready to parse a next sentence for the same already initialized interface.

The Interface Intermediary 312 can support caching of the Thin Client 302 state (particularly when the Parser 310 is stateless or semi-stateful) so that the Thin Client 302 does not need to maintain this state information. The Thin Client 302 then only refers to its state at the Interface Intermediary 312 using unique identifier (UID) to minimize information exchange between these two processes.

Parser Downloaded to Client

As described in foregoing portions, the LL system and processes can reside in any combination of client-local and remote locations, and, in addition, the processes can migrate. The Parser 310 can exist on a remote server device 504 in any compatible executable form, or it can be installed on the client device 502 if necessary software and hardware requirements for the given implementation are met.

Although the Parser 310 can run on a remote server device 504, there are several reasons why a user can choose to install the parser 319 locally. For example:

Improved response time—When the Parser 310 is running on a remote server, latency due to Internet activity and multiple user activity can cause unwanted delays. Having the parser local to the client will provide faster response times.

Local Application use—The parser 310 is required by a client-local non-Internet-based application Security—Interacting with a local parser in a secure environment is potentially more secure than LL system interactions over the Internet, even if those interactions are secure.

Mobility—The user wants to use a LL system application when disconnected from the Internet.

The Parser 310 can be downloaded and installed to the client device 502 in one of several ways and several formats, for example, the following:

- from the Internet, disk, or CD-ROM, and
- as a browser plug-in, application extension, e.g. an ActiveX component, (for applications such as Microsoft Word™, Excel™, or Access™), applet, or application.

In a flexible manner, the parser 310 can reside remotely for some users and locally for other users who have downloaded it.

Interface Descriptor Specification

Interface Descriptor

The Interface Descriptor 306 of the LL system describes inputs needed to parameterize the LL system to initialize and permit interaction between a LL Client and server device 504. An example format of the Interface Descriptor 306 is as follows:

<LL properties, grammar, lexicon, portable specification, experts, translations>

The elements, which are described further below, can be encoded in a parenthesized notation, in XML, or by other means.

The elements of the Interface Descriptor 306 and their parts can be stored together or separately (accessible by reference) on web pages, in databases, or by other means. The LL system interfaces can be associated with any network or Web resource (e.g., text, HTML, XML, directories, databases, other data sources, services, other MIME types).

The association can be direct or indirect. For instance, directly, the Interface Descriptor 306 can appear on a web page (e.g., using HTML's META tag or embedded XML), be associated with a link or image (e.g., associated with a banner ad on a web page), as a distinguished file type (e.g., .ll) in a directory system, or as part of a reflection scheme associated with a resource (e.g., query a data source like a DBMS for its LL interfaces). An alternative direct scheme is to permit LL interface developers to register LL interfaces at some central authority, then when a resource is encountered, a check is made at the authority to see if there is a LL interface and if so it is returned. Indirectly, LL resources can be associated with resources and discovered by search engines or traders, or they can be auto-generated for certain kinds of resources like DBMSs.

The association of LL interface to resource/application can be one-to-one, many-one, one-many, or many-many. In the many-one case, several LL interfaces can be associated with a resource. Examples are LL interfaces in different languages, LL interfaces that offer different security privileges and access rights, LL interfaces that offer different skill levels or are geared to different classes of customers or users (e.g., preferred customers, children), LL interfaces that take geography, time, or other contextual information into account (e.g., <city> entertainment, stock quotes that are immediate versus 20 minutes old), or just LL interfaces with different foci—one for weather and one for news associated with a portal web page. Such properties can be associated with LL interfaces and used to filter only LL interfaces of interest to the user. In the one-many case, a single LL interface can access information from multiple resources or applications (e.g., one LL interface can access multiple databases).

Other Interface Descriptor 306 types for the LL system can be defined for other kinds of resource types, e.g., directories, agents, relational DBMSs and other kinds of data sources, embedded devices, email systems, word processors, etc. For example, the following:

<ODBC url, properties>—provides a basic descriptor that identifies a URL as accessing an ODBC compliant DBMS. The descriptor can appear on a web page or in a repository indicating an ODBC database accessible over the web. A LL interface generator (a LL utility tool) applied to the database can extract the schema (including relations, views, attributes, joins, access privileges, optional content) and can generate a corresponding LL Interface Descriptor <LL dbproperties, dbgrammar, dblexicon, dbtranslations, dbportable specification, dbexperts>. All in one automated step (e.g., one mouse click), the user can be using LL to query a remote database that formerly did not have a LL interface. Automatically generated interfaces can be manually refined and improved by LL interface developers (which can be the end-user), possibly using LL utility tools like the LL Portable Specification Editor.

<MSWord url, properties>—can be used to designate a default grammar and lexicon for Microsoft Word documents, permitting queries like "Show me—the table of contents"

<LL-ID uid, properties>—in this case, the Interface Descriptor 306 with unique ID uid has already been registered at the parser farm 308. This type of Interface Descriptor 306 just references an already stored interface using the UID as a key. For high demand applications, many parsers 310 in the Parser Farm 308 can be pre-initialized with LL interfaces that are in constant use.

<LL-LDAP directory-url, properties>—this Interface Descriptor 306 is used by applications that allow the user to navigate LDAP directory trees (not using natural language per se but still being driven by the LL completion-based scheme). Note: for some data structures like directories, explicit LL Interface Descriptors are not needed—LL can navigate such data structures on the fly.

New kinds of Interface Descriptors 306 for the LL system can be defined and registered with the Parser Farm 308.

In addition to explicit Interface Descriptors 306, the Interface Descriptors 306 for the LL system can be implicit, derived through an interaction, as when a user using a file editor right clicks on a file of type Microsoft Access (.mdb) and select a menu item LL that automatically generates the Interface Descriptor 306 to an Access database.

Properties

The Interface Descriptor 306 contains a "Properties" element that consists of an extensible collection of zero or more properties that provide metadata about an interface. Properties can be encoded in various ways; for instance in XML, <property> . . . </property>. Examples of properties are: interface owner, date created, version, language, security access control list. Correspondingly, values are associated with properties, for instance: thompson@objs.com, 30 Jun. 2000@18:05:03, a version timestamp, English, ((*@objs.com read)(thompson@objs.com write)). New kinds of values can be defined in a straightforward manner.

Exactly how LL-Properties are defined depends on the LL system implementation and installation. For instance, information on identity and security can be used to grant different users different levels of access. Information about language can be used to select English variants of database grammars as opposed to variants in other languages. Versions can be used to distinguish the latest version when LL interfaces are updated.

Grammar and Lexicon

The NLMenu system, earlier referred to herein, described a format for grammar rules and lexical entries as well as how NLMenu's parser operates. To summarize, grammars have a distinguished root non-terminal symbol and consist of collections of context free attributed grammar rules, constraints, and translations. Significant extensions to the scheme employed in the NLMenu system are described below.

Representation Format

In the LL system, the grammar and lexicon can be encoded in XML with DTDs or XML Schema to define their structure making them convenient to store, export and import, easier to parse using standard XML parsers, easier to extend with new attributes, and easier to develop viewers for using, e.g., XSL. An earlier OBJS patent application XML2Java can be used to translate XML to internal Java or C++ classes. The NLMenu Lisp syntax for grammar rules and lexicons is also still supported. We could also accept other grammar formalisms including Sun's Java Speech Grammar Format (JSGF).

Just as properties can be associated with LL system interfaces, they can be associated with grammar and lexical rules. One use of this capability is to associate "help" strings with these elements that are displayed in a separate help window during sentence construction when the user moves the mouse over selectable items. Another use is to associate banner advertisements with selected parts of a grammar.

In addition, an LL parser's internal data structure (the parse tree) can be externalized, represented in Lisp notation, the W3C Document Object Model, or XML or by some other means. This is useful especially to interface developers. Grammars, lexicons and translations can be edited in a text editor or in a specialized LL editor that can additionally check rules for well formedness and connectedness to insure all terminals and non-terminals are accessible from the grammar start symbol. Such an editor could be an XML-XSL based structure editor.

Simpler Grammar Formats and Simpler Parsers

Flat and Tree Grammars

For certain important classes of applications, grammars and lexicons that are a proper subset of the original NLMenu formalism are of interest. These include:

Flat grammars of the form root ⇒ {collection of rules} where each rule consists of <string; translation> and each string is a sequence of lexical elements (words or phrases) and experts (e.g., <city>) separated by a separator like "-" ending with a terminator like ";". For example, Internet-Keyword-root ⇒ {<<city>-weather; URL><<quote-<stock>; UR> . . . . } can encode a collection of internet keywords. This kind of grammar has advantages: it is very easy for even inexperienced end-users to write or extend. It is easy to compile this grammar into a tree grammar (see below) that can be recognized efficiently by a simple tree grammar parser much simpler than the original NLMenu parser. Flat grammars are also referred to as sentence grammars or phrase grammars to emphasize that they may be used to reference sentences, phrases, or other concatenations of strings and experts, e.g., including navigations of hierarchies or path expressions.

Tree grammars are similar to flat grammars except they introduce a branching structure so rules appear in a form similar to the following example
<substring1 ((substring2 ((substring3; translation123)
(substring4; translation124))
(substring5; translation15))>

In this example each substring is a list of items (words, phrases, or experts) and the rule is a short hand for three sentence grammar rules corresponding to substring1/2/3. substring1/2/4 and substring1/5. This kind of grammar also is simple to write for naïve end-users and also requires a simpler parser than the original NLMenu parser.

Flat grammars and tree grammars offer an easy way for LL interface designers to get started using LL. Given experience with these, it is not such a leap to the full power of NLMenu-like grammars and lexicons that add the ideas of separate lexicons, non-terminals and constraints.

Support for Multiple Kinds of Parsers

Corresponding to the multiplicity of kinds of grammars supported, the LL system supports a corresponding multiplicity of parsers (as described earlier). In addition to the NLMenu parser, other parsers are supported by the LL system:

Flat grammar parser—initialized with flat grammar rules. Internally, builds a more efficient tree grammar and uses the tree grammar parser.

Tree grammar parser—follows the tree structure when parsing (no pushdown stack).

Directory structure parser—this parser is given a directory root of a remote directory and follows the directory tree in a manner similar to a tree grammar parser except the "grammar" is an externally represented data structure and accessor functions are used to access the children nodes given a parent node.

Other LL "parsers" can be defined for use with the LL parser farm. Any program that takes as input a selected item (word, phrase, or expert) and returns a set of next item choices (including End of Sentence and other meta symbols) is an acceptable LL parser that can be plugged into the parser farm.

Corresponding to these simpler grammars are simpler LL Interface Descriptors that identify the type of grammar and do not contain separate lexicons, portable specifications, or translations, e.g., <LL-flat-grammar properties, flat-grammar>.

Operations for Combining and Subsetting Interfaces

In the LL system, operations on interfaces can be used to compose interfaces together or to limit the visibility so a user does not see all possibilities all the time. It is sometimes useful to combine LL interfaces statically so a subgrammar can be separately tested, debugged and shared among larger grammars. Sometimes, it is useful to combine LL interfaces dynamically, as when one query bridges to include sublanguages of more than one resource that together participate in a response. Sometimes it is useful to subset interfaces so the LL DBMS user sees an interface to a small number of relations at a time with bridging phrases that stage in other interfaces that load other grammars or turn on parts of larger grammars. One example is several agents each with their own grammar so that an end-user begins by communicating with one agent but bridging phrases allow communication to continue with a second agent and so on. Another example is a large DBMS with hundreds of relations where the LL interface is partitioned in such a way that only interfaces to a subset are visible at a time with bridging phases used to activate other subsets. A third example is personalization, in which an end-user adds grammar rules (usually in a simpler grammar format like sentence or tree grammars) that can augment a grammar that can be more complex that is supplied by a community. The personalized grammar can be given precedence over the community grammar in ambiguous cases.

Combining Interfaces and Grammars

It is sometimes desirable to combine two or more LL interfaces so they appear as one. There are several approaches, including the following:

Multiple Parsers Approach—Using a <LL-combined list-of-LL-interfaces> Interface Descriptor, the collection of LL interfaces is combined. Parsers are initialized for each LL interface in the list. When the user selects a next item from the list, it is sent to all parsers with an active parse. From each such parser, all lists of next legal choices are collected, merged into one composite list, and this composite list is presented to the user; this process iterates. If the user selects an item that some parser cannot parse, then rather than return an error, this parser is dropped from the list of currently active parsers. This approach is somewhat heavyweight in that it can invoke several parsers. An advantage is, it works with several kinds of LL interfaces simultaneously, e.g., the grammar and parser types in the list do not all have to be of the same kind.

A variation of this approach can be used to provide run-time LL interface version upgrades. If one parse is open with a first part of a sentence parsed, then a second version of the same interface can be initialized, made to parse the sentence so far, and then it can take over to parse the rest of the sentence.

Combining Grammars and Lexicons Approach—when two or more LL interfaces of the same kind are to be combined, a kind-specific combination approach can be used.

Combining two or more Sentence Grammars or two or more Tree Grammars—if S1 ⇢list-of-sentences1 and S2 ⇢list-of-sentences2 then a combined interface S12 can be derived by appending the two lists of sentences. A similar approach works for Tree Grammars.

Combining two NLMenu grammars and lexicons—The basic idea is to create a new start symbol that maps to S1 or S2 where S1 and S2 are the start symbols of the original grammars. In addition, care must be taken to systematically rename non-terminals (for instance by concatenating Si- to each non-terminal on the left and right side of rules where ever they appear) to insure non-overlapping namespaces Chaining Grammars Together The grammars of the LL system also extend NLMenu grammars in that LL provides a means of chaining grammars and embedding them. LL grammars can contain external references to the start symbol of other grammars. Such external references occur on the right hand side (RHS) of some grammar rule. Normally, an element on the RHS is either a non-terminal or a terminal that references a lexical entry. Now, in addition to these, the right hand side can contain a reference to another grammar (actually, to another LL Interface Descriptor containing such a grammar). LL supports two cases, as follows:

Include case—if the format of the RHS element reference is <INCLUDE: reference to LL descriptor> then the referenced grammar is read eagerly at grammar initialization time as if it were part of the top level LL grammar; or, it is read lazily on demand, and loaded dynamically into the current parser state. Symbol names are given unique extensions to avoid conflict with existing LL symbols. If the same grammar needs to be included from several places in a top level grammar, then a local name in the top level grammar can be assigned and used in each such reference, e.g., <INCLUDE (local name foo) reference>. If it is intended that a non-terminal in a child grammar be equivalent to a non-terminal in a parent grammar, an extra field (EQUIV (nt1 nt2)(nt3 nt4) . . . ) is added in the Include specification listing the equivalent non-terminals. An advantage of Include case is partitioning grammars into smaller units permitting better grammar modularity, facilitating potential reuse.

External case—if the format of the RHS element reference is <EXTERNAL: reference to LL descriptor> then the referenced grammar is read dynamically during parsing when the symbol is encountered—a new LL parser is assigned and continues the parse until the referenced subgrammar is completed and returns a subtranslation to the parent grammar. Local names can be used for the same purpose as the Include case but only one subgrammar parser is needed and does not have to be reinitialized.

Bridging to another grammar can be implicit and seamless to an end-user or a status indicator can be used to indicate the transition to the new grammar (e.g., Loading LL interface).

Both Include and External are recursive. Parent interfaces can reference child interfaces that themselves reference child interfaces, and so on.

The Include case requires LL Interface Descriptors to use the full LL Interface Descriptor format (where the primary grammar and all loaded subgrammars are of the same kind). In the External case, each subgrammar can be of a different kind (e.g., flat, tree, directory, or others to be defined), since each subgrammar is managed by a separate parser. Both cases permits state variables from the current grammar/parser to be passed to the subgrammar/subparser to retain context and at completion of the subgrammar/subparser, the value of state variables is returned to the parent grammar/parser.

In both Include and External grammar descriptors, the "reference to LL descriptor" can be a direct reference (e.g. a URL) or a trader advertisement that describes a LL interface being requested or a resource for which such a LL interface can be generated. This permits dynamic binding at run time of newly discovered or dynamically created LL-enabled resources.

Combining Portable Specifications

Another means of combining two LL interfaces is via an operation that combines LL portable specifications (see below). An automatic operator can be used to combine two or more portable specifications. Each portable specification defines a DBMS, the relations to be covered, the attributes of those relations, etc. as described in more detail in the section Portable Specification and Portable Specification Editor below. When two portable specifications are composed, they are combined by a concatenation-like operation so that the result now references multiple DBMS, relations from each DBMS (with appropriate namespace changes so it is clear which relations come from which DBMS), and attributes from each DBMS. Similarly, multiple portable specifications can be combined. The end result of automatically combining portable specifications is a composite portable specification that now contains references to relations and their attributes from several DBMSs. Combining this with the LL SQL database grammars and lexicons yields queries to multiple DBMS. Using a LL interface associated with a combined portable specification, the end-user can seamlessly state queries whose translations now target any of the covered DBMS systems. Without further modification, these queries separately access the respective DBMS systems, and do not permit joins across the different systems.

An extension to the Two and Three Way Joins capability permits cross-DBMS queries. The extension requires definition of an Export/Import operator for each DBMS so subresults from one DBMS can be exported from one, then imported to the other in order to permit the relational join to be completed. At present, implementing such cross-DBMS joins involves manually modifying the translations associated with grammar rules corresponding to Two and Three Way Joins as well as defining Export and Import operations for the DBMS systems. This process is being automated for certain DBMS implementations and can support federation of homogeneous or heterogeneous DBMS. It is a little more work for the LL interface designer but using such a composite LL interface can ppear seamless from the LL end-user point of view.

Constraints to affect Interface Visibility, Progressive Disclosure, and Profiles A subsetting technique involving grammars involves the stylized use of the constraints that occur in NLMenu grammar rules. Normally, constraints are used to limit the range of a variable and to block certain transformations. For instance, a singular noun phrase in the subject position specifies the linguistic constraint number=singular which propagates to the predicate insuring only singular verb phrases will follow.

In a new use of constraints, collections of rules are treated as a set, given a name, and the rule set can be turned on or off simply by setting a variable associated with each rule set to be on or off. This approach can be used for several purposes. One is to encourage training first on a subset of a grammar and then to progressively disclose more of the grammar by turning on other parts of the grammar instance, one can train a user to use of the SQL grammar to use a subset just containing Select-From-Where then later turn on the Having clause. Rule sets can also be turned off. This can also be useful simply to control the apparent size of an interface that a user wishes to see; for instance, the part of a University grammar dealing with students can be turned off. Bridging from one part of a grammar to another may or may not turn off rules from the previously visible portion of the grammar. Completing a query may or may not return the user to the old visibility starting point.

Another use of constraints is to use them in conjunction with profile variables. These are simply normal variables whose values are set in some profile operation, e.g., extra-grammatical as in filling out a form with the end-user name, location, age, etc. or grammatical, in an earlier LL dialog with sentences like "My name is—<type your name> . . . ".

Profile variables can model the user, the location, the time, the application, or other information of interest that can affect the sentences that can be used to communicate to a resource.

A similar use of constraints is to hide or make visible grammar rules providing certain users with capabilities not available to other users. For instance, some user can have access rights to Insert a new course in a course catalog and so has the Insert rule turned on. Another user can just be able to view the course catalog and so has the Insert a new course rule turned off. In a similar example, profiles can be role-based, so an accountant sees the accountant view of the grammar, an Auditor the auditor view, and a HR worker the HR view. Each such view is controlled by a profile that governs which subset of the grammar is visible. Some employees who support multiple roles then can have multiple views visible simultaneously.

Supporting Other Control Strategies Beyond Left-to-Right Parsing

Another enhancement is where the grammar control strategy can include not only left-to-right completion-based parsing but also top down control. This is useful when users want to specify math formulas, expressions, names, addresses and other grammatical units. This can be accomplished by defining experts that are forms-based to allow separate specification of fields like an address that resolves top down into a name and street address and city where the name further resolves into optional title and then firstname and lastname; or by experts that permit typing of whole expressions; or by experts that recursively invoke a LL parser to recognize a non-terminal, e.g., <name expert>, or by a small change to LL grammar rules and the display to permit displays of the form "whose address is <address>" where address is a non-terminal expert in the grammar which is replaced by a particular address but which can be highlighted and re-specified if the user edits the non-terminal expert (similar to the way terminal experts work).

Grammar Writer's Tools and a Semi-automatic Test for Grammatical Ambiguity

LL interface developers benefit from tools that help them construct grammars. There are several such tools:

A well-formedness test just checks grammar, lexicon, portable specification and other LL Interface Descriptor components to insure they are syntactically well-formed.

A connectivity tool checks to make sure all grammar rules are accessible from the root and all are defined and that all lexical elements are also defined and accessible from the root.

The portable specification editor coupled with DBMS grammars and lexicons can be viewed as an automated tool for creating interfaces to DBMS systems without requiring the knowledge of how to write grammar and lexicon rules.

An ambiguity checker can be employed that automatically generate all paths through a LL grammar of length N items or less. This is trivial for sentence and tree grammars but needed for NLMenu and composed grammars. It operates in a recursive manner to generating all legal choices, then recursively and automatically selecting choices recursively. If at any time it parses a complete sentence (or whatever phrase structure element it is started with), a check is made to see if there are more than one active parse trees and each are returned, meaning the sentence is ambiguous. Also, all complete sentences that can include further completions are stored. Recursive parsing continues until all parses result in a complete sentence. Then each such sentence that has legal continuations is parsed in the same manner until its completions result in longer sentences. And so on. For grammars with recursive rules, this process does not necessarily terminate (as there are an infinite number of legal parse trees) but for practical purposes, the grammar developer can stop the process when they wish or when all sentences of length less than or equal to N items have been tested. Alternatives are for the grammar writer to seed the process with sentences to be tested or to use a visual display to view progress through the space of possible parses. Ambiguous parses are not necessarily bad but some means of disambiguating them is needed so that executing a query provides an unambiguous result.

Portable Specification and Portable Specification Editor

The portable specification data structure in LL is similar to the portable specification in NLMenu. Both encode categories like relations, attributes, whether attributes and non-numeric or numeric, and two and three way joins. Both are used as inputs to the parser to augment the grammar and lexicon with a domain specific data model.

Figure 12:
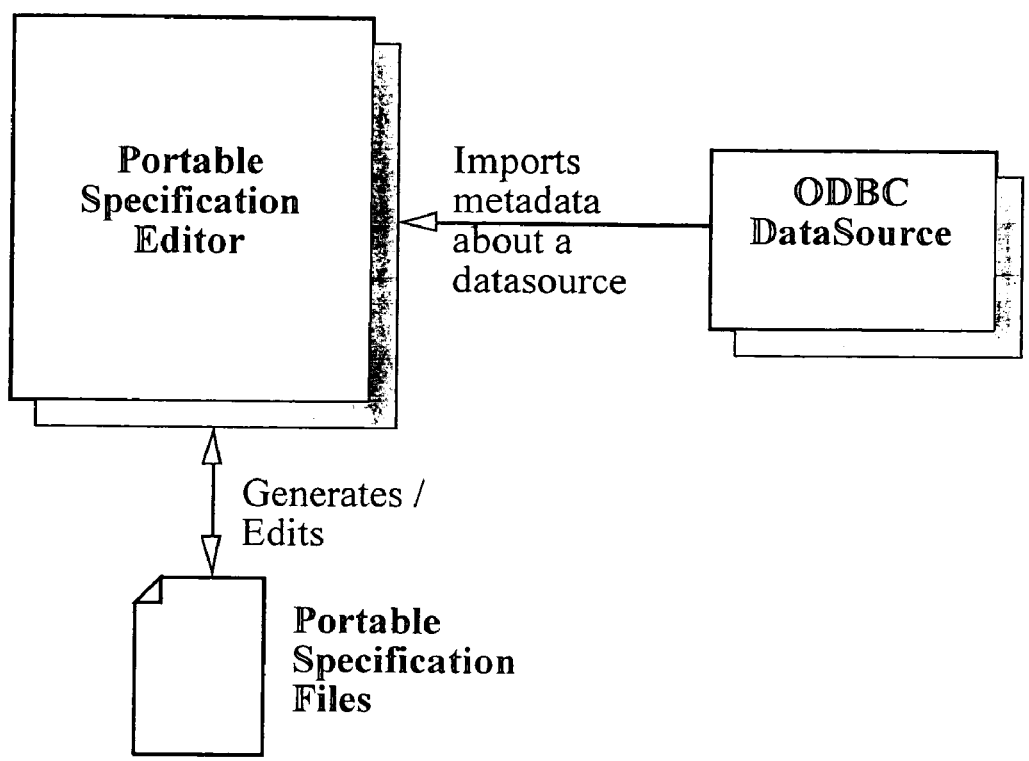
FIG. 12 illustrates embodiments of inputs and outputs of a Portable Specification Editor.
Figure 13:
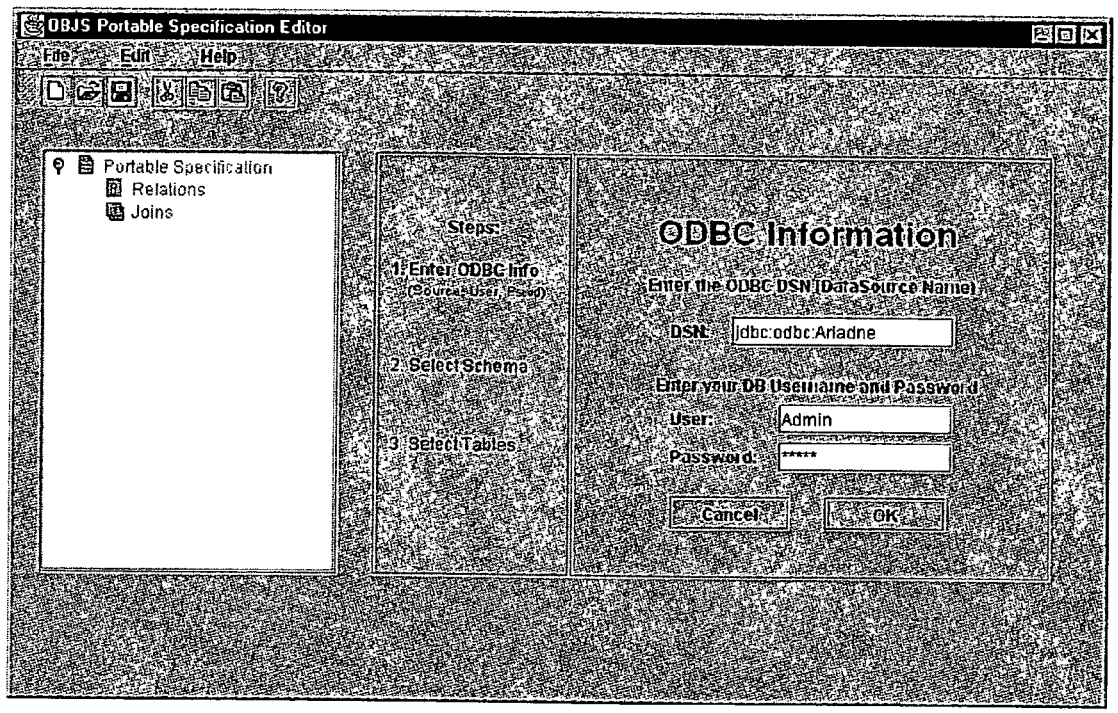
FIG. 13 illustrates embodiments of methods of importing an ODBC database schema into the Portable Specification Editor.

Referring to FIG. 12, the inputs and outputs of the LL Portable Specification Editor (PSE) are shown. The PSE imports a database schema from an ODBC-compliant DBMS, possibly located remotely on the web, and accesses its relational catalog using SQL queries or the ODBC interface, copying it into the PSE to automatically populate the portable specification data structure with default values, as shown in FIG. 13. PSE import has been tested for ODBC compliant Oracle 8 and Microsoft Access.

Figure 14:
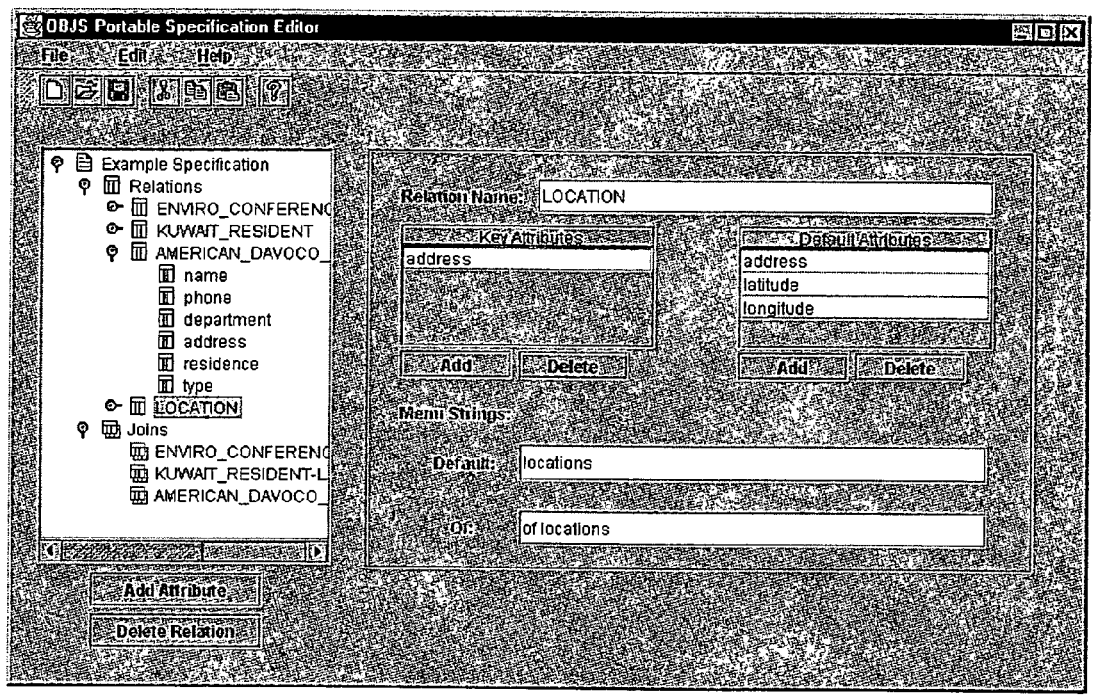
FIG. 14 illustrates embodiments of a screen-shot of the Portable Specification Editor, illustrating how an interface designer can create a portable specification from a database schema that can then be used to auto-generate a guided natural language interface.

Referring to FIG. 14, a screen-shot is shown of the LL Portable Specification Editor, illustrating how a LL interface designer can create a portable specification from a database schema that can then be used to auto-generate a LL interface. The user can then use the PSE optionally to edit the portable specification to remove or rename tables, add views, specify security privileges for this interface, or attributes or select LL types for domains or specify lexical variants including for values.

Alternately, the process of importing a portable specification from a DBMS and generating a LL interface can be automated so there is no interface designer PSE editing step and a user simply selects a data source and applies the PSE import and export operations to it to immediately yield a corresponding LL interface, that is immediately usable. The resulting interface will be less usable than a hand-edited one but should be useful for many purposes.

Additionally, the Portable Specification Editor can be extended to create active event driven or polling connections between a LL interface and a data source. Then, if the data source changes, the LL interface can change dynamically. This scheme can be extended to cache information elements to avoid recomputing them every time.

Experts

Experts in LL are similar to experts in the original NLMenu system with several extensions.

FIG. 15 shows a simple expert used to specify a value in a LL query or command. FIG. 16 shows a data source expert used to specify a value in a LL query or command. (shown during and after invocation of the expert).

One extension is new kinds of experts—these include:
  form experts—these experts display a form with some mandatory and possibly some optional slots to fill in. For instance, an address form with slots for address, city, state and zip can result in a translation in a string format "$address, $city, $state $zip"
  and/or experts—these experts display a set of choices and the user can select one or more and designate "and", "or", "but not" e.g., resulting in a string format like "green or red" or "any color but not blue".
  category experts—these represent categories and hierarchies, including inheritance hierarchies. A category display can show items for sale, with categories including books and with books having subcategories for rare books, comic books. A selection from such an expert can result in a string "comic books" concatenated at the end of a string "Find stores that sell . . . "

Another extension is additions to experts that provide integrity checking and feedback if user values are illegal or out of range, help associated with experts, units and unit conversions, client-side experts, and the ability for interface developers to add new experts to the library.

LL Interface Descriptors can be associated with experts, of the form <LL-Expert url, properties> and experts can be downloaded to a LL Selection Subsystem.

Translations and Execution

Translations in the LL system and methods occur as they did in the original NLMenu system but with several extensions. In NLMenu, translation fragments are associated with lexical elements and with experts. Grammar rules provide templates for combining translation fragments. A parse tree, built by the parser, corresponding to a terminal phrase or sentence tells how to construct a translation, starting with the leaves, moving up through the intermediate nodes applying translation rules until the final translation is formed at the root. The NLMenu parse tree has a Lisp syntax and is constructed in response to a Show Translation or Show Execution message.

In the LL system and methods, translations can be formed during parsing or certain sub-trees are produced and a request for an intermediate translation is made. Translation can use string concatenation or Lisp-like lambda notation or other means to combine translation fragments associated with lexical elements, experts, and grammar rules. The resulting translation can represent data, URLs, a command like an SQL query (see FIG. 14), a program in a scripting language, a call to a subroutine, a translation to another language, including another natural language, or a combination of these.

FIG. 18 shows execution results of a sample LL query in a tabular format. Translation evaluation occurs when the Translation is returned by the LL Parser to the LL Interface Intermediary, with a command Execute, forwarded by the LL Interface Intermediary to the LL Command Intermediary which coordinates how to execute the result (typically by forwarding the Translation across the Network to the Target Application and receiving a Result back) and how to return Results to the LL Thin Client Output Display.

Evaluations of sub-translations can occur during or after a parse is completed. Such intermediate evaluations can simply make the evaluation of the translation more efficient as when an initial part of a database query is evaluated "in the background" while a user is still specifying the rest of the sentence. Or evaluations can affect legal completions for the rest of the query, as in "Find dresses size 18 color . . . " where dress sizes selected affect color choices.

A sophisticated extension is a capability for cooperative response, wherein if the user's query results in a request for which no items are returned (it is overly constrained), then the translation tree can be examined to examine the results of subtranslations to see which subqueries or combinations of subqueries resulted in no selections, and the user can be presented with this information. So for a query "Find airports in McLean Tex. where a 747 can land and which have sufficient fuel . . . ", the user may be alerted either after specifying the query or even during the specification that there are no runways in McLean Tex. where you can land a 747. A further sophisticated extension is to automatically relax some criteria so that the search considers an area within 100 miles of McLean with results ordered by closeness to McLean. These added capabilities can be effected by operators added to the translation that evaluate subqueries during the parse and by operators that relax subqueries to broaden their result. In addition, some intermediate translations can evaluate to a command to load and continue sentence construction using a new LL interface, as described above in the Grammar and Lexicon section.

In cases where more than one parse tree exists (the grammar is ambiguous) then more than one translation can exist. To disambiguate, the user may be requested to review the possibilities. Or the sentence can be logged for review by the interface developer if ambiguity was unintended.

Network Transport and Security

The LL system and methods operate in a distributed environment. Information transported across process boundaries and/or between client and server can be sent through any available transport—e.g., sockets, RMI, CORBA IIOP, . . . in any reasonable format—e.g., text, XML, encoded in private or secure formats. Examples of LL transport protocols, both based on HTTP due to its popularity and ease of integration with other web protocols, are:

the client connects to the HTTP-based LL server and sends a URL that uses attribute-value pairs to encode the message, typically encoding some control information and a next item that has been selected. The server responds with a new page representing the new state of the parse with next legal choices. For example, the message string sent from the LL client to the server can look like:

http://127.0.0.1/cgi-bin/
menutest.exe?cat=NOUN&ipp=825&% ds=coabs&
%choice="of+Kuwait+residents"&%state=1&
%phrase=$List+the$VERB$address$ATTRIBU-
TE$of+Kuwait+residents$NOUN the client connects to the HTTP-based LL server and issues the POST method with the content type and accept header set to "application/XML". The content of the POST body is the LL XML document that is being sent, typically encoding some control information and a next item that has been selected. The results are sent back to the client with the content-type of "application/XML". POST messages are typically used with HTML forms and do not need to evaluate to a new page. An advantage of this second protocol is that POST messages are not visible to the user in the URL.

With respect to security, the LL system and methods can use transport level authentication and encryption where available. For transports that do not provide this level of authentication, individual entries or the entire message (where messages are any communications that travel between client and server) can be signed and encrypted. To avoid the problem of service spoofing where a service attempts to pose as the LL service, the LL service object should be signed; a client then verifies the LL service object by verifying the signature. How the client obtains the authoritative public key depends on service discovery and licensing, beyond the scope of this description.

Envisioned Uses

The LL system and methods can become pervasive, used in conjunction with or interfaced to other desktop and web technologies, as described below. Some of it describes technical innovations and some of it is implied by technical innovations already described.

Internet and Web

The LL system and methods pave the way for guided NLI technology to become a mainstay common technology for a broad set of web uses, including personal, business-to-customer, and business-to-business uses. One or more LL interfaces can be located on any web page or can be associated with any web resource, including banner ads; they can be made accessible via browser and search engine input windows and/or built into or plugged into applications.

Component-Based Middleware

The LL system, packaged as a component that can be added into existing application programs, provides the advantages of LL coverage to potentially many applications. For instance, a LL Java bean for ODBC databases makes Oracle 8, Sequel Server, Access and other database data much more accessible, via natural language queries, to distributed clients in a network. Similarly, LL can be plugged into desktop applications, e.g., a LL add-in to Microsoft Word could permit commands like "Delete-paragraphs-containing-hidden text."

Speech Technology, Wireless Web and Controllers

The LL system and methods provide a route for NLI technology to become an integral part of the speech and wireless devices, and opens up a broad range of new applications. It provides a way for LL interfaces to be downloaded to devices and for users to interact with remote LL servers to specify commands or queries to control remote applications. Recently, IBM demonstrated speaker recognition as well as text-to-speech on a Palm III and others have demonstrated hand-held devices with speaker phone capabilities, so LL coupled with speech on wireless devices is a logical next step. For instance, a smart phone user can use speech-based guided LL commands to ask for weather, sports, stock or other information (e.g., speaking selections that compose LL sentences while looking at a small display that shows sentence completions). The LL system enables structuring much more complex queries and commands than can be understood with high assurance by conventional NLI technologies on these devices. Plus much of the processing can be remote, well suited to the smaller memories and processing capacities of these devices; only the LL interface and results display need be on the device; the parsing and access to the applications and data sources can be remote. Without LL, speech-based NLI (question answering) will have the same coverage problems as unconstrained typein-based NLI. LL is complementary to speech—a LL capability delivered across networks will open the speech question answering market.

Similarly, a home user can use a LL-enabled VCR controller to say "Record program-on channel 11-on Saturday from 3 pm to 4 pm" (or simply "Record-Xena") or to give a command to the home water miser "Water-the front yard-starting at 9 pm-for an hour-and-the back yard-starting at 10 pm-for 30 minutes-each night-but not if-Internet weather-indicates it will rain that day-or if-local water rationing is-in effect". Special purpose smart devices could be used with LL interfaces but more likely general purpose controllers (some merger of smart phones and palm PDAs) will be the physical controller displaying LL. The water miser example illustrates that LL grammars can access multiple data sources—home watering, the weather, and city water rationing information.

Similarly, a robot, game, or toy controller can be developed with LL displays possibly coupled with speech to control remote devices. For example, a LL-enabled Lego-train world permits the user to issue commands to various controllable entities—"Train:-slow to 20 mph-stop-at the next two stations. Red Car: stop-at intersection-if-the train-is approaching" With a suitable model of the world and toys with manipulable APIs, toys could be controlled by such LL commands. Hobbyists could develop LL control grammars. Toys and other devices could even be extended to use LL to communicate with the user or other toys if dialog management or planners are used in conjunction with LL.

Database Technology and Directories

As already described, the LL systems and methods can enable web-based users to discover and immediately access relational DBMS data sources they have never seen before. The same approach would work with other data sources (e.g., object databases, web data sources), and generally for any LL-enabled application, e.g., web-based agents, workflow, simulations, etc. Another kind of web data structure where.

It is easy to derive a simple navigable structure are directories that contain files of known types as well as subdirectories. LL can navigate such directory structures to return elements selected. For instance, a LL interaction can follow a directory tree from www.objs.com to directories people, Thompson, and finally file resume.doc.

Traders, Search Engines, What's Related, FAQs, AskJeeves, and Internet Keywords

The LL system and methods, coupled with search engines and traders (like OBJS DeepSearch based on WebTrader), enable discovery of resources (like databases or agents) that have published LL Interface Descriptors on the web or registered them with traders, permitting users to locate and interact with such LL-enabled resources. For LL, this can be done by including LL Interface Descriptors on web pages or in files and letting traders and search engines harvest and index web pages and other resources containing LL Interface Descriptors. Alternatively, LL Interface Descriptors can be stored in one or more central registries or databases, placed there and registered by LL interface developers.

The LL system and methods enhance search engine (SE) and trader technology in a number of ways:

The scheme for attaching LL interfaces to resources substantially enhances SEs and traders, which can be used to locate resources, and if these are LL-enabled, then LL enables a user to access these resources using guided LL commands. Thus, if a web page or data source is returned by a SE query, then guided LL queries and commands can further query the resource. This is a new way to integrate information retrieval keyword based search with structured LL search.

SEs and traders can be used specifically to search for and discover LL-enabled resources along with additional filter criteria, e.g., finding LL-enabled travel agents that speak Swahili can be done with a SE or trader query: "travel agent" AND language=Swahili AND <a pattern that matches a LL Interface Descriptor>"

If a SE or trader keeps a history of all prior searches, then a display, for instance in outline format, can list LL queries and commands at some nodes and keyword-based SE queries and commands. This is a natural display in which to specify new queries and also show query histories (past and stored queries or commands), with queries at the nodes. This display can easily be coupled with directory or search engine or trader displays, including LL queries at subnodes and is complemented by including directories, search engine searches or trader searches displayed at nodes. For instance, a trader or directory display can have a LL descriptor leaf and clicking it results in specification of a LL command, which if executed return results that are displayed as outline children. It is reasonable to add an editing capability to an outline display so it becomes an outline editor so LL queries and other nodes can be deleted or modified or moved. A further extension to such a display gives the user the ability to specify that queries are to be run periodically and new results flagged since the last time. LL itself can be used to specify timing constraints on when to rerun queries.

A What's Related scheme like Netscape's could be augmented by users if there are associated 0.11 files or LL interfaces associated with resources. Then when What's Related is applied to the resource it can not only find the sorts of things found now (i.e., related pages that are similar to a page) but also the associated LL Interface Descriptors. Associating LL interfaces with web resources (e.g. URLs, data sources, applications, agents, internet keywords) yields a new form of LL-based navigational browsing, that could become common on the web and that can complement or augment What's Related schemes.

A scheme like AskJeeves or various FAQ repositories could be augmented with LL so guided queries support the user to select categories of questions (e.g., sports-softball-coaching) and then frequently asked questions within a domain ("How is-coaching-girls teams-different than-boys teams". The grammars can be simple LL sentence or phrase grammars or can use the full complexity of LL grammars. FAQ repository conversion to LL can be automated such that LL queries map to FAQ questions and translations map to FAQ answers. In a seamless way, LL could also guide users to command or query any LL-enabled FAQ resource to avoid the need for a central repository of Jeeves-like questions.

A number of LL extensions improve on today's Internet Keyword (IK) schemes, making LL a significant complementary extension.

IKs can themselves resolve to LL interfaces. They can then act like a category with the LL interface shown either in the same window or a different one. For example, IK "shoes" can resolve into a LL interface that provides information on kinds of shoes, how shoes are made, purchasing shoes, name brands, FAQs, etc.

One could use today's IKs in a guided mode where once the user enters a word, completions among IKs are identified. Just using the IKs (without even adding complex grammars), one could derive a simple sentence grammar (as earlier defined) of the form Internet_Keyword ⧖word—word— . . . for each keyword phrase (or alternatively Internet_Keyword ⧖each internet keyword). The grammar could be refined manually to add location and other experts, including map, menus, and other non-language modalities Then LL could be used to guide users to use Internet Keywords. LL IKs can have unique or multiple associations, e.g, so shoes can be registered to many users and have multiple associations.

The LL system can be used in a similar way to today's IKs, that, LL can be used to augment a browser URL window so you can not only type IKs but also select LL elements. This capability is referred to as LL IKs. LL IKs are a generalization of IKs from today's simple phrases to LL grammar-based associations. Rather than just supporting strings, the grammars can be linguistic, e.g., "my patent" could resolve my to patents of the individual or organization rather than to Netword's IK patent (that is, "my patents" would resolve to patents of this individual). LL IK queries can be arbitrarily more complex "web pages at www.objs."com" created between 1/1/00 and 1/20/100 and . . . ". Translations too can be far more complex, including not only URLs, mailto:s, and ftps: but also providing access to user owned databases or other resources, as described earlier.

LL IK interfaces can be made personal in the sense that users can create their own associations and LL IK grammars. So they can add a grammar for "timesheets" allowing them to find timesheets before a certain date, containing a certain charge number, covering a certain employees hours worked, etc. This local grammar can be in addition to other community LL IK grammars or conventional IKs. A number of such LL IK grammars could be considered part of one larger grammar such that combined_grammar ⊗startnodes of all grammars registered and selected. Then completions would continue any grammar registered.

Alternatively or additionally, LL interfaces can be stored associated with resources on the web. Then if a LL IK grammar returns a web page itself containing a LL Interface Descriptor then the new grammar can be invoked. For instance, a LL IK grammar for the company OBJS can return a LL Interface Descriptor located on the www.objs."com" web page, which further provides grammars for accessing OBJS papers, people, projects etc. The grammar for a paper permit queries about authors, table of contents, or figures in section 5. Associations can be made in different ways—for instance, a directory can contain a file with extension .ll containing an LL interface. Or an HTML page can contain a meta or XML element <LL> . . . </LL>

The various approaches to combining LL, IKs and FAQs can be combined to lead to a scheme that the end-user sees as seamless, where LL is used to specify IKs or more complex grammars using a starting grammar, but if LL interface descriptors are discovered by any means, then LL can continue queries using these decentralized and newly discovered responses. This is in contrast to the current IK schemes that use a centralized repository for storing IKs. Here the IKs are stored associated with internet resources and discovered during the course of IK queries.

Other Uses of LL System and Method

In the same way that LL interfaces can be associated with various kinds of Internet resources and services, they can be associated with agents, providing user interfaces for end-users to command and query possibly mobile agents. LL translations can be to standard agent communication languages (ACLs) or to custom agent programmatic APIs. LL makes it possible to communicate with web-based agents that a user is not familiar with (in the same way it can for other resources the user is not very familiar with).

LL interfaces could be used to specify more complex email filters than are presently permitted by email filter schemes like Netscape's, e.g., "All mail messages from folder X where complex-condition1 and from folder Y where complex-condition2." In addition, LL interfaces could be sent by email and activated by email recipients provided they were connected to a Network with LL parsers accessible or that they had local LL parsers and could access the applications the LL Interface Descriptors described. This could permit a report writer to use LL to define an active report document containing several LL queries, then use email to request a DBMS to respond to the queries, then forward the resulting report by email to subscriber recipients. In a back office, an office manager could send email to a recipient containing a query "Send me your timesheets from April and May 1998" which could be received by a recipient or an agent on the recipient's machine to retrieve and return the requested timesheet.

LL interfaces could be used in other distributed applications to specify rules, controls, or other sorts of commands. LL interfaces can be used to state complex timing constraints on when to update a database, channel, or other trigger, e.g., "Update-my stock portfolio-every hour-unless-any stock in my portfolio-changes by more than 5%-in which case-alert me." LL interfaces could be used in conjunction with forms filling interfaces permitting a user to fill in certain elements on a form using constrained input, e.g., Fill in BLOOD information here: "blood type AB-and-blood count 1000." LL interfaces could be used to interface to running simulations. A query like "Show me enemy planes within fifty miles of friendly forces" can result in a display where icons for enemy planes move into view if they pass the query condition. This could be an active query with continuously refreshed results. LL interfaces could be used in conjunction with workflow systems to permit distributed users to specify routing or other conditions, e.g., "Route-the message-to Bill-for revisions. Alert me when-he-sends-that message-to the boss." As this example shows, LL can also support limited anaphoric reference (to pronouns and deictic references, e.g., this and that).

One LL interface can use the auto load capability to bridge to another grammar to continue a query. A navigation like "SIGMOD Conference-papers-author-Thompson-company-papers-Thompson" can start at the SIGMOD conference site, bridge to a local grammar about SIGMOD papers and locate an author (which might entail querying a DB and portions of a grammar can be derived on-the-fly) then bridge to the author's company (located in the paper) and then to the company's domain and then to another grammar that locates papers by employees. This example sounds more like LL-enabled path navigation, which it is, but it demonstrates that LL can be used for this as well as for more well-formed natural language grammars. This requires loading and bridging possibly several grammars but the bridging can be seamless—LL can identify when LL is leaving one grammar and starting another but the user does not have to be aware of these transitions.

The LL system can be used not just with English subsets but other natural language subsets and dialects, and also with formal languages, e.g. to help users specify SQL, programming language constructs (e.g., subroutine or function calls), or mathematical expressions.

The LL system can also be used to recognize constructs other than sentences, for instance phrases, e.g., "hotels-in <town>-whose cost is-moderate". LL can be modified straightforwardly to participate in guided conversations, including telephone dialogs, as in:

system: What is your destination airport?
user: LL: <destination airport> | any airport near <city>
system: What time do you want to arrive?
user: LL: <day> <time-of-day>

Similarly, the LL system can be used to define new concepts or to name sequences of activity, e.g., Define "Build a Bridge" to mean " . . . sequence of commands". LL commands could be broadcast to teams of agents which then decide how best to execute the commands by some internal means.

Different LL interfaces can be associated with the same resource, service, agent or application. These different interfaces can be used by users with different roles—naïve users, sophisticated users, administrators, users with various security access privileges, and even by users who speak different languages. Properties associated with LL interfaces (e.g. language=English) can be used to filter LL interfaces so only appropriate ones are selected. These same properties can be used within LL interfaces to parameterize the interfaces, similar to or as extensions of the portable specification.

LL interfaces governing resources can be associated with security privileges so only users with correct privileges can have access to the resource. One way to implement this is to support different LL grammars for a resource with different security clearance properties. When the LL service requests a resource, it must validate, perhaps by password or other key, its access rights so grammars are not exposed to unauthorized users. Alternatively, these access rights can be built into LL grammars as constraints so some grammar rules are only accessible to users with certain rights.

LL interfaces can also be augmented with additional information. LL grammar rules and lexical elements can have associated "help" strings that might be displayed on demand in another window to indicate what a command does or the attributes associated with a relation. Another use of this is to associate banner advertisements with certain kinds of queries, data sources, or grammar rules in order to customize a LL interface or even queries within the interface. This metadata information can be combined with other information like user profiles or contexts. LL can support grammars that define the user's local context: me ⊗name:CraigThompson|email:thompson@obiscom|street-address:...|IP-address: . . . . This local context information can then be useful in other LL interfaces, e.g., Show me movies (implicit context—location is near the user and time is at or after now). Related to this, LL interfaces can be defined to capture user data (e.g., age, sex, location, etc.) or data captured partly from other utilities (e.g., GPS) and LL-based utilities can be used to develop models that affect LL, e.g., "Find-Italian restaurants-near here" as one is driving in a GPS-enabled car. Finally, associated banner ads themselves can have LL interfaces.

LL path navigation can be extended to follow other kinds of paths as well as grammar designated paths—for instance, the World Wide Web Consortium (W3C) has defined Xlinks as an extension to XML (http:/www.w3."org"/TR/2000/WD-xlink-20000221/). LL completion could follow Xlinks in addition to LL grammars when locating associated resources. Xlinks could also be used to define associations or links between grammars, permitting LL traversals from one grammar to another. LL path expressions can themselves be saved, stored persistently, named, edited, and later reselected and reevaluated—used either manually in a natural extension to browser bookmarks or programmatically in conjunction with timing expressions that could tell how often to evaluate the path. In this latter capacity, they can be used as part of a scheme to create new resources (sometimes called channels) that are updated based on changes to information linked to be path expressions.

LL interactions and translations can be logged to central or distributed collection points for later review, e.g., by interface developers wanting to improve LL grammar coverage or understand if users can ask the questions they want to; by system administrators wanting to track system usage or understand how effective or resource consumptive LL is; and by analysts wanting to understand query patterns and statistics for e-commerce purposes, or for other purposes, e.g., to display example queries to other users.

Finally, the LL system and methods can be combined with and used for training on unguided NLI systems, so users can learn what are possible things to say as well as the general way of saying them so the system has a better chance of understanding the speaker.

The LingoLogic (LL) System enables many end-users to discover and use guided natural language commands and queries to control and access possibly many (possibly remote) resources and applications.

The LL system architecture permits and enables separation of the parser from the end-user input display interface, including providing for a multiplicity of server-based parsers of differing types in a parser farm to service many client-based end-users and many requests from each end-user, and provides a way to install a variety of kinds of interface displays on client devices anywhere in a network like the web (including one or more LL interfaces on any web page) without an explicit action of downloading the capability by the end-user, providing an immediate means of delivery of the guided NLI capability to anyone anywhere.

LL thin clients constitute subsystems for displaying end-user interfaces, accepting and processing end-user inputs (constructing sentences in some language) and displaying results of queries or commands, on the client machine. The parsing can happen remotely, though LL parsers themselves can be downloaded as a plugin to improve efficiency and fault-tolerance. Developers can define LL interfaces for their applications and can make these available over a network, like the World Wide Web. Parsers and grammars of different types and complexities can be defined and invoked appropriately for different tasks and purposes. Grammars can be composed dynamically and controlled in context-dependent ways. LL-enabled resources can be discovered dynamically using various means, e.g., traders, search engines.

Technical Advantages

The embodiments, particularly, the LL system, provide capability to use guided natural language can be delivered in a scalable fashion to a world-wide user-base. Eventually, the LL system technology can become common on the web, desktop, and in wireless and embedded devices, used in place of, in addition to, or combined with other interface technologies. The LL system can enable a user to use a limited subset of natural language to query a remote database that the user has possibly never seen before, interact with a travel agent or shop bot, interact with a workflow, program a VCR or smart phone, or command toys in a toy village. Integrated with a browser or search engine, the user can search for and discover LL-enabled resources on the web, and communicate with these using guided natural language, or a speech interface to LL guided language.

The LL system provides technical advantages including:

Scalability—A parser farm (extensible collection of parsers of different types) located at one or more LingoLogic (LL) servers can service many LL clients. The same end-user can interact with more than one parser, simultaneously, with sentences at different points of completion. New parsers are created and launched as needed, or destroyed when no longer needed.

Lightweight Client Technology—Thin LL clients (a client can be no more than a web page or it can be a plugin) can be launched from an end-user machine (e.g., by clicking a link, phrase button, menu, or avatar in a browser or by typing or speech) and efficiently downloaded to a user machine (typically to the user's web browser) with no manual installation process; the LL query/command construction interface can appear in various forms (e.g., completion menus, cascaded menus, outline menus); and can be used by the end-user at the client machine to construct and execute commands or queries that control some, typically remote application(s).

Optimization—LL parsers can be downloaded to client machines as plugins to improve performance.

Third Party Interface Development—Typically, the resource (e.g., services, databases, other data sources, agents, objects, or applications) owner will develop the LL interface descriptions and make them available to the intended user base. When an resource is accessible remotely, it is also possible for a third party to independently develop an interface description to that remote resource thereby enabling LL-based remote access to it without the owner necessarily needing to be aware that the application is being accessed specifically by LL.

Automated, Dynamic Datasource Interface Generation—Datasource descriptors can be defined (or if they already exist, can be leveraged) which enable LL Interface Descriptors to be automatically and dynamically generated.

Using Search Engine or Trader Technology to Locate LL Interfaces—A user can search a network like the World Wide Web using a search engine, trader or database system to find LL-enabled web resources. Such engines can return LL descriptors and these can be used to connect the user to these resources enabling the user to engage in LL guided NLI interactions with such LL-enabled resources.

Dynamic Composition of LL Interfaces—LL interfaces can be composed statically or dynamically. Bridging phrases within a query can seamlessly stage-in other LL interfaces (which can even be discovered dynamically by search engines, traders, or other means). Properties associated with LL interfaces can filter use of the interface or can affect whether some rules are turned on or off. Properties can be used for identifying target applications and how to identify, find, and invoke them, for versioning, security, context (e.g., geographic, temporal), or for other purposes.

Speech Integration—LL interfaces can be combined with speaker independent speech interfaces, where the speech engine is located on the client or at a speech engine farm used in conjunction with a LL parser farm.

Integration of LL into other areas—LL can be combined with other desktop applications as a plugin, and with web technologies including browsers, search engines, traders, databases, directories, XML and HTML.

In the foregoing specification, certain specific embodiments have been described. Those of ordinary skill in the art will appreciate that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of a natural language interface, comprising the steps of:
    inputting to a thin client a query component for communicating via the natural language interface;
    requesting an appropriate parser for the query component for obtaining the natural language interface;
    assigning an appropriate parser;
    parsing the query component;
    predicting a next query component based on prior query components; and returning a parsed translation.

2. The method of claim 1, wherein the steps of inputting, parsing, and predicting are repeated until a well formed natural language grammatical constituent is completed.

3. A method of a natural language interface, comprising the steps of:
    inputting to a thin client a query component for obtaining the natural language interface;
    communicating to an interface intermediary;
    communicating to an interface descriptor data source for enabling the natural language interface;
    generating an interface descriptor;
    communicating the interface descriptor to the interface intermediary;
    communicating the interface descriptor to a parser farm for enabling the thin client to communicate via the natural language interface;
    requesting an appropriate parser corresponding to the interface descriptor for obtaining the natural language interface;
    assigning an appropriate parser;
    parsing;
    communicating a translation from the step of parsing, to the interface intermediary; and
    communicating the translation to the thin client.

4. The method of claim 3, further comprising repeating all of the steps of inputting, communicating to an interface intermediary, communicating to an interface descriptor data source, generating, communicating the interface descriptor to the interface intermediary, communicating the interface descriptor to a parser farm, parsing, communicating a translation from the step of parsing, and communicating the translation to the thin client, all until a full sentence is translated.

5. The method of claim 4, further comprising the steps of: delivering the translation to a command intermediary; and processing a target application using the translation.

6. The method of claim 4, wherein the steps of delivering and processing each follow the step of repeating.

7. The method of claim 3, wherein the step of inputting is performed geographically remote from the steps of assigning and parsing.

8. The method of claim 3, wherein the step of inputting and the step of assigning maintain correspondence through communications over a network.

9. The method of claim 3, further comprising the step of predicting at least one of a next allowable query component based on prior steps of inputting and parsing; listing the at least one of the next allowable query component; and selecting the at least one of the next allowable query component from the list for a next step of inputting.

10. The method of claim 9, further comprising the step of repeating, until a full well formed sentence is translated, the steps of: predicting at least one of a next allowable query component based on prior steps of inputting and parsing, listing the next allowable query component, and selecting the next allowable query component from the list for a next step of inputting, inputting, communicating to an interface intermediary, communicating to an interface descriptor data source, generating, communicating the interface descriptor to the interface intermediary, communicating the interface descriptor to a parser farm, parsing, communicating a translation from the step of parsing, and communicating the translation to the thin client.

11. The method of claim 3, wherein the steps of parsing and predicting occur at a first geographic location; and the steps of listing and selecting occur at a second geographic location.

12. A system for a natural language interface, comprising:
a thin client for communicating via the natural language interface;
an interface intermediary communicatively connected to the thin client;
an interface descriptor data source for enabling the natural language interface, communicatively connected to the interface intermediary;
a command intermediary communicatively connected to the interface intermediary;
a parser farm for enabling the thin client to communicate via the natural language interface, communicatively connected to the interface intermediary; and
a parser for obtaining the natural language interface, communicatively connected to the parser farm and the interface intermediary;
wherein the thin client includes a user interface for providing a display selected from the group consisting of: a translation status indicator for at least one of the elements of the system; a cascaded menu display with subitems, a sequence of links; at least one of a next allowed query constituent; a guide for input of at least one of the query constituent; a result of a speech recognizer; a drop down menu; an outline menu; a filtered list of the at least one of the next allowed query constituent; a grouped list of the at least one of the next allowed query constituent showing subcategories; an active list of the at least one of the next allowed query constituent based on previous partial query constituent input; and an explicit call to the system from the target application;
a remote element from the thin client, wherein the thin client receives from the remote element the at least one of the next allowed query constituent and the remote element is the speech recognizer.

13. A system for a natural language interface, comprising:
a thin client for communicating via the natural language interface;
an interface intermediary communicatively connected to the thin client;
an interface descriptor data source for enabling the natural language interface, communicatively connected to the interface intermediary;
a command intermediary communicatively connected to the interface intermediary;
a parser farm for enabling the thin client to communicate via the natural language interface, communicatively connected to the interface intermediary; and
a parser for obtaining the natural language interface, communicatively connected to the parser farm and the interface intermediary;
wherein the thin client includes a user interface for providing a display selected from the group consisting of: a translation status indicator for at least one of the elements of the system; a cascaded menu display with subitems; a sequence of links; at least one of a next allowed query constituent; a guide for input of at least one of the query constituent; a result of a speech recognizer; a drop down menu; an outline menu; a filtered list of the at least one of the next allowed query constituent; a grouped list of the at least one of the next allowed query constituent showing subcategories; an active list of the at least one of the next allowed query constituent based on previous partial query constituent input; and an explicit call to the system from the target application;
a remote element from the thin client, wherein the thin client receives from the remote element the at least one of the next allowed query constituent and the remote element is the speech recognizer;
wherein the thin client and the interface intermediary are each included in a client device communicatively connected to the network;
wherein the client device downloads the thin client and the interface intermediary over the network.

14. A method, comprising the steps of:
receiving an interface descriptor for specifying a type of a parser and initialization of the parser;
initializing the parser;
determining at least one of a next allowed query constituent;
communicating the at least one of the next allowed query constituents;
receiving a communicated selection corresponding to the step of communicating;
inputting the selection to the parser; and
repeating the steps of determining, communicating, receiving and inputting.

15. The method of claim 14, further comprising the steps of:
translating the at least one of the next allowed query constituent;
executing the result from the step of translating; and
returning the next result from the step of executing to the step of determining.

16. The method of claim 14, wherein the parser is included in at least one parser farm.

17. A method of operation of at least one parser and a parser farm, comprising the steps of:

receiving a request by the parser farm for a select one of the at least one parser;
assigning the select one of the at least one parser by the parser farm;
initializing the select one of the at least one parser by the parser farm, via an interface descriptor input to the select one of the at least one parser; and
communicating by the select one of the at least one parser of an identifier of the select one of the at least one parser, to the parser farm.

18. A system for a natural language interface comprising:
a thin client for communicating via the natural language interface;
a parser farm for enabling the client device to communicate via the natural language interface;
a parser for obtaining the natural language interface;
a first communications network for communicatively connecting the thin client and the parser farm;
a second communications network for communicatively connecting the parser to another element selected from the group consisting of the parser farm and the thin client;
wherein the parser is selected from the group consisting of: NLMenu grammar parser, flat grammer parser, tree grammar parser, and directory structure parser.

19. A system for a natural language interface, comprising:
a thin client for communicating via the natural language interface:
a parser farm for enabling the client device to communicate via the natural language interface;
a parser for obtaining the natural language interface:
a first communications network for communicatively connecting the thin client and the parser farm:
a second communications network for communicatively connecting the parser to another element selected from the group consisting of the parser farm and the thin client;
wherein an operational characteristic of the parser is selected from the group consisting of: a stateless mode, a stateful mode, single-threaded, multi-threaded, and semi-stateful mode.

20. A system for a natural language interface, comprising:
a thin client for communicating via the natural language interface;
a parser farm for enabling the client device to communicate via the natural language interface;
a parser for obtaining the natural language interface;
a first communications network for communicatively connecting the thin client and the parser farm;
a second communications network for communicatively connecting the parser to another element selected from the group consisting of the parser farm and the thin client;
wherein the thin client includes the parser.

21. The system of claim 20, wherein the parser is downloaded over the communication network by the thin client.

22. A system for a natural language interface comprising:
a thin client for communicating via the natural language interface;
an interface intermediary;
a first communications network connecting the thin client and the interface intermediary;
an interface descriptor data source for enabling the natural language interface;
a second communications network connecting the interface descriptor data source and the interface intermediary;
a command intermediary;
a third communications network connecting the command intermediary and the interface intermediary;
a parser farm for enabling the client device to communicate via the natural language interface;
a fourth communications network connecting the parser farm and the interface intermediary;
a parser for obtaining the natural language interface:
a fifth communications network communicatively connecting the parser to the parser farm; and
a sixth communications network for communicatively connecting the parser and the interface intermediary;
wherein the interface descriptor data source communicates an interface descriptor for defining an interface and providing a parameter of the system, selected from the group consisting of: property, grammar, lexicon, portable specification, expert, and translation.

23. The system of claim 22, wherein the system includes more than one natural language interface, wherein the more than one natural language interface are composed by merging more than one portable specification to create a combined portable specification.

24. The system of claim 22, wherein constraints in a grammar are employed to turn-on or turn-off at least one collection of grammar rules for reasons selected from the group consisting of: supporting training on subsets of the grammar; supporting controlling the complexity of the grammar; reflecting security access control privileges; reflecting roles of users; and reflecting personalization and user profiles.

25. A method for using a portable specification by a natural language interface system, comprising the steps of:
extracting a schema information from a data source;
translating the schema information to an encoded format of structural information as the portable specification; and
directly obtaining a natural language interface corresponding to the portable specification;
wherein the step of generating includes accessing an ODBC database management systems (DBMS) to obtain an associativity for use by a remote device to enable access to an associated database of the system.

26. A system for a natural language interface comprising:
a thin client for communicating via the natural language interface;
an interface intermediary;
a first communications network connecting the thin client and the interface intermediary;
an interface descriptor data source for enabling the natural language interface
a second communications network connecting the interface descriptor data source and the interface intermediary
a command intermediary;
a third communications network connecting the command intermediary and the interface intermediary;
a parser farm for enabling the client device to communicate via the natural language interface;
a fourth communications network connecting the parser farm and the interface intermediary;
a parser for obtaining the natural language interface;
a fifth communications network communicatively connecting the parser to the parser farm; and
a sixth communications network for communicatively connecting the parser and the interface intermediary;
wherein the interface descriptor data source communicates an interface descriptor for defining an interface and providing a parameter of the system selected from the group consisting of: property, grammar, lexicon, portable specification, expert, and translation;
wherein the parameter of the system is selected from the group consisting of: at least one type of grammar, at least one grammar component, and at least one type of grammar that is an at least one grammar component.

27. The system of claim 26, further comprising a combiner, wherein the combiner combines more than one of the parameters.

28. The system of claim 26, wherein a first of the at least one grammar includes a first non-terminal and the first non-terminal referencing a second non-terminal of a second of the at least one grammar.

29. The system of claim 28, wherein a characteristic of the referencing is selected from the group consisting of: Include meaning to read rules from the second of the at least one grammar into the first of the at least one grammar during initialization of the parser; and External meaning that during derivation of a sentence, if an external referencing symbol of the first of the at least one grammar is encountered, then a new parser is dynamically assigned and initialized with the second of the at least one grammar.

30. The system of claim 29, wherein the characteristic of the referencing is selected from the group consisting of: Import and Export; wherein the Import and Export are each defined for more than one database management system to enable any combined interface system to support all more than one database management system in Join operations in which one argument relation of a join is exported from a first one of the database management system and imported to a second one of the database management system at which the join is executed to provide as a result a cross-database management system join.

31. A system for a natural language interface, comprising:
a thin client for communicating via the natural language interface;
an interface intermediary;
a first communications network connecting the thin client and the interface intermediary;
an interface descriptor data source for enabling the natural language interface;
a second communications network connecting the interface descriptor data source and the interface intermediary;
a command intermediary;
a third communications network connecting the command intermediary and the interface intermediary;
a parser farm for enabling the client device to communicate via the natural language interface;
a fourth communications network connecting the parser farm and the interface intermediary;
a parser for obtaining the natural language interface;
a fifth communications network communicatively connecting the parser to the parser farm; and
a sixth communications network for communicatively connecting the parser and the interface intermediary;
wherein the interface descriptor data source communicates an interface descriptor for defining an interface and providing a parameter of the system, selected from the group consisting of: property, grammar, lexicon, portable specification, expert, and translation;
comprising more than one parser, wherein at least a select one of the more than one parser is assigned and initialized via the interface descriptor.

32. A system for a natural language interface, comprising:
a thin client for communicating via the natural language interface;
an interface intermediary;
a first communications network connecting the thin client and the interface intermediary;
an interface descriptor data source for enabling the natural language interface;
a second communications network connecting the interface descriptor data source and the interface intermediary;
a command intermediary;
a third communications network connecting the command intermediary and the interface intermediary;
a parser farm for enabling the client device to communicate via the natural language interface;
a fourth communications network connecting the parser farm and the interface intermediary;
a parser for obtaining the natural language interface;
a fifth communications network communicatively connecting the parser to the parser farm; and
a sixth communications network for communicatively connecting the parser and the interface intermediary;
wherein the interface descriptor data source communicates an interface descriptor for defining an interface and providing a parameter of the system, selected from the group consisting of: property, grammar, lexicon, portable specification, expert, and translation;
comprising more than one parser, wherein at least a select one of the more than one parser is assigned and initialized via the interface descriptor;
a merger, communicatively connected to the interface descriptor data source, the thin client and each parser assigned and initialized via the interface descriptor;
wherein each parser assigned and initialized via the interface descriptor communicates to the merger a selection of next allowed query components and the merger merges the selection from each parser and communicates a resulting list of the merged selection from each parser to the thin client.

33. A system for a natural language interface, comprising:
a thin client for communicating via the natural language interface;
an interface intermediary;
a first communications network connecting the thin client and the interface intermediary;
an interface descriptor data source for enabling the natural language interface;
a second communications network connecting the interface descriptor data source and the interface intermediary;
a command intermediary;
a third communications network connecting the command intermediary and the interface intermediary;
a parser farm for enabling the client device to communicate via the natural language interface;
a fourth communications network connecting the parser farm and the interface intermediary;
a parser for obtaining the natural language interface;
a fifth communications network communicatively connecting the parser to the parser farm; and
a sixth communications network for communicatively connecting the parser and the interface intermediary;
wherein the interface descriptor data source communicates an interface descriptor for defining an interface and providing a parameter of the system, selected from the group consisting of: property grammar, lexicon, portable specification, expert, and translation;

comprising more than one parser, wherein at least a select one of the more than one parser is assigned and initialized via the interface descriptor;

a merger, communicatively connected to the interface descriptor data source, the thin client and each parser assigned and initialized via the interface descriptor; wherein each parser assigned and initialized via the interface descriptor communicates to the merger a selection of next allowed query components and the merger merges the selection from each parser and communicates a resulting list of the merged selection from each parser to the thin client;

a list of active parsers; wherein each parser assigned and initialized via the interface descriptor is eliminated from the list of active parsers if the parser can not parse a next allowed query component selected from the merged selection.

\* \* \* \* \*